United States Patent
Phillips

(12) United States Patent — Phillips
(10) Patent No.: US 10,259,923 B1
(45) Date of Patent: Apr. 16, 2019

(54) ELECTRICALLY-CONDUCTIVE COMPOSITIONS AND METHODS OF USING THEM WITH PIPELINES

(71) Applicant: Alan D. Phillips, Roanoke, VA (US)

(72) Inventor: Alan D. Phillips, Roanoke, VA (US)

(73) Assignee: Phillips Intellectual Properties, LLC, Roanoke, VA (US)

( * ) Notice: Subject to any disclaimer, the term of this patent is extended or adjusted under 35 U.S.C. 154(b) by 12 days.

(21) Appl. No.: 15/449,311

(22) Filed: Mar. 3, 2017

Related U.S. Application Data

(60) Provisional application No. 62/303,240, filed on Mar. 3, 2016.

(51) Int. Cl.
  *H01B 1/24* (2006.01)
  *C08J 9/00* (2006.01)
  (Continued)

(52) U.S. Cl.
  CPC .............. *C08J 9/008* (2013.01); *B05D 1/02* (2013.01); *B05D 7/146* (2013.01); *B05D 7/222* (2013.01); *C08G 18/0838* (2013.01); *C08G 18/14* (2013.01); *C08G 18/42* (2013.01); *C08G 18/48* (2013.01); *C08G 18/5021* (2013.01);
  (Continued)

(58) Field of Classification Search
  CPC ........ C08J 9/008; C08J 9/009; C08J 2205/00; C08J 2375/06; C08J 2375/08; C08J 2375/12; C08J 2205/05; C08J 2205/052; C09D 7/70; C09D 175/06; C09D 175/08; C09D 175/12; C09D 5/084; C09D 5/24; B05D 7/146; B05D 7/222; B05D 1/02; C08K 3/042; C08K 9/04; C08K 2201/005; C08K 2201/001; C08K 2201/011; C08K 3/046; C23F 13/16; C08G 18/42; C08G 18/48; C08G 18/5021; C08G 18/14; C08G 18/0838; C08G 2150/90; C08G 2150/60; H01B 1/24

See application file for complete search history.

(56) References Cited

U.S. PATENT DOCUMENTS

2013/0197158 A1* 8/2013 Kim .................. C08L 75/04
  524/590
2015/0274924 A1* 10/2015 Pandey ................ H05K 9/0079
  428/304.4

(Continued)

*Primary Examiner* — Mark Kopec
*Assistant Examiner* — Jaison P Thomas
(74) *Attorney, Agent, or Firm* — Rhodes IP PLC; Christopher R Rhodes

(57) ABSTRACT

Minimum Federal Safety Standards for corrosion control on buried oil and natural gas pipelines stipulate that metallic pipes should be properly coated and have impressed-current cathodic protection (ICCP) systems in place to control the electrical potential field around susceptible pipes. In certain examples described herein, electrically-conductive nanocomposites can be used and provide intrinsically-safe foam materials without the dielectric shielding issues of existing materials used to physically protect and stabilize buried pipelines. As cured or formed by customary spray applications, the nanocomposite foams described herein are directly compatible with ICCP functionality wherever foam contacts the metallic pipe. Various foam compositions and their use with underground pipelines are described.

32 Claims, 1 Drawing Sheet

(51) Int. Cl.
  *C09D 5/24*   (2006.01)
  *C09D 5/08*   (2006.01)
  *C08G 18/08*  (2006.01)
  *C08G 18/50*  (2006.01)
  *C08G 18/48*  (2006.01)
  *C08G 18/42*  (2006.01)
  *C08K 9/04*   (2006.01)
  *C08K 3/04*   (2006.01)
  *C09D 175/12* (2006.01)
  *C09D 175/08* (2006.01)
  *C09D 175/06* (2006.01)
  *B05D 1/02*   (2006.01)
  *B05D 7/22*   (2006.01)
  *B05D 7/14*   (2006.01)
  *C23F 13/16*  (2006.01)
  *C09D 7/40*   (2018.01)

(52) U.S. Cl.
  CPC .............. *C08J 9/009* (2013.01); *C08K 3/042* (2017.05); *C08K 3/046* (2017.05); *C08K 9/04* (2013.01); *C09D 5/084* (2013.01); *C09D 5/24* (2013.01); *C09D 7/70* (2018.01); *C09D 175/06* (2013.01); *C09D 175/08* (2013.01); *C09D 175/12* (2013.01); *C23F 13/16* (2013.01); *H01B 1/24* (2013.01); *C08G 2150/60* (2013.01); *C08G 2150/90* (2013.01); *C08J 2205/00* (2013.01); *C08J 2205/05* (2013.01); *C08J 2205/052* (2013.01); *C08J 2375/06* (2013.01); *C08J 2375/08* (2013.01); *C08J 2375/12* (2013.01); *C08K 2201/001* (2013.01); *C08K 2201/005* (2013.01); *C08K 2201/011* (2013.01)

(56) References Cited

U.S. PATENT DOCUMENTS

2017/0122488 A1\* 5/2017 Dagesse .................. F16L 57/06
2018/0126396 A1\* 5/2018 Ellis ....................... B05B 7/0408

\* cited by examiner

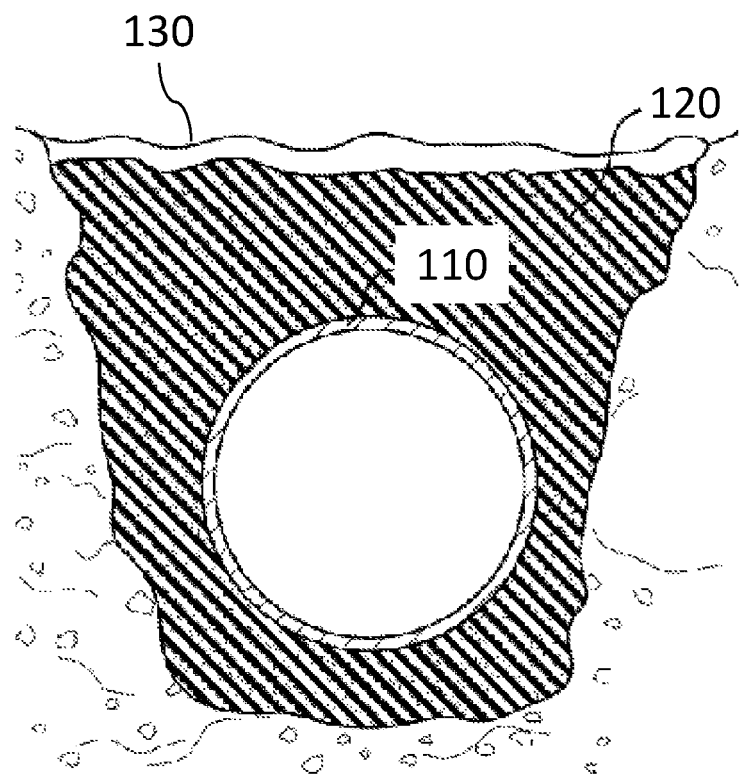

ELECTRICALLY-CONDUCTIVE COMPOSITIONS AND METHODS OF USING THEM WITH PIPELINES

PRIORITY APPLICATION

This application is related to, and claims priority to and the benefit of, U.S. Provisional Application No. 62/303,240 filed on Mar. 3, 2016, the entire disclosure of which is incorporated herein by reference.

FEDERALLY SPONSORED RESEARCH STATEMENT

This invention was made with government support under Contract #DTRT571410020 awarded by USDOT/PHMSA. The government has certain rights in the invention.

TECHNOLOGICAL FIELD

This application is directed to compositions and methods which can be used in connection with fluid pipelines. More particularly, certain embodiments described herein are directed to electrically conductive compositions that can be used with, e.g., disposed on, sprayed on, etc., pipelines to be placed underground or which remain above ground.

BACKGROUND

To adequately protect underground pipelines, specialized coatings (e.g.—fusion-bonded epoxies) must conduct cathodic protection (CP) current when a coating disbondment occurs. Industry experts have long emphasized that most external corrosion on pipelines is caused by disbonded coatings that electrically shield the exposed metallic substrate from the well-known benefits of CP.

SUMMARY

Certain illustrative configurations are directed to various methods and compositions which can be used in connection with pipelines and other devices designed to transport and/or extract one or more fluids. Geotechnical spray polyurethane foam (SPF) compositions rendered directly compatible with a normal cathodic protection (CP) system functionally should provide desirable material to pipeline owners (and not to mention the public at large) when it comes to responsible mitigation (or control) of corrosion in buried hazardous material pipelines.

Inventive nanomaterials development and optimized plural-component processing methodologies directed toward incorporating functionalized graphitic nanoplatelets within thermoset spray foam compounds can provide for more responsible SPF materials production. Unlike the polyurethane systems currently utilized today in high-throughput buried pipelines construction, novel graphene-based compositions that afford significant increases in electrical conductivity throughout an entire synthesized foam can support underground operating conditions which are more compatible with the proven corrosion mitigation aspects of CP.

In some aspects, electrically-conductive SPF compositions realized in accordance with nanoplatelet morphology may be produced with blowing agents and customary mixing and/or application equipment. The field-level synthesis of non-shielding polyurethane-graphene composite systems that can serve to not only perform in harmony with CP, but further substantiate the continued usage of existing geotechnical spray foam compounds provides a significant advance in the Oil & Gas pipeline industry. Incorporation (via dispersion) of controlled amounts of functionalized, electrically-conductive graphite oxide nanoplatelets (GONPs) within primarily chemically- and partially water-blown SPF formulations can support a more responsible (and safe) utilization of spray-applied foams on a widespread oil & gas infrastructure basis. Controlled amounts of functionalized GONPs to be introduced to different geotechnical SPF compounds may comprise such nanoparticle introductions being tuned and/or matched to concentrations having been pre-determined as directly compatible with optimal ICCP system functionality. One illustrative example of such nanoparticle concentration optimization may center upon concentrations in which, for instance, the NACE-specified—850 mV criterion (per National Association of Corrosion Engineers Standard SP0169) is more readily attainable versus otherwise less compatible nanofiller concentrations.

In one aspect, a reaction mixture which is curable to form an electrically-conductive polyurethane foam comprises (a) component A which comprises an isocyanate, and (b) component B which comprises at least one polyol, a dispersion of reduced carbon nanomaterials, a blowing agent, and optionally, a cell-opening surfactant.

In another aspect, a reaction mixture which is curable to form an electrically-conductive polyurethane foam which has a direct current electrical conductivity directly compatible with impressed current cathodic protection system functionality as employed in underground oil and gas pipeline facilities comprises (a) component A which comprises an isocyanate, and (b) component B which comprises at least one polyol, a dispersion of reduced carbon nanomaterials, a blowing agent, and optionally, a cell-opening surfactant.

In certain examples, the dispersion of reduced carbon nanomaterials comprises graphite oxide treated, or functionalized, with an organic isocyanate. In other examples, the dispersion of reduced carbon nanomaterials comprises isocyanate-treated nanoplatelets formed by exfoliating graphite oxide nanoplatelets from isocyanate-treated graphite oxide in a dispersing medium using ultrasonic mixing apparatus. In some embodiments, the dispersing medium comprises an organic liquid. In some examples, the dispersion of reduced carbon nanomaterials comprises graphite oxide nanoplatelets reduced in the presence of a reducing agent and the at least one polyol in-situ of component B. In other examples, the dispersion of reduced carbon nanomaterials comprises reduced, polyol-treated graphite oxide nanoplatelets dispersed in a dispersing medium. In some embodiments, the dispersing medium comprises an organic liquid. In additional examples, the dispersion of reduced carbon nanomaterials comprises graphite oxide nanoplatelets reduced in the presence of a reducing agent such as hydrazine. In further examples, the dispersion of reduced carbon nanomaterials comprises reduced graphite oxide nanoplatelets with a C/O atomic ratio greater than unreduced carbon nanomaterials. In some examples, the reduced graphite oxide nanoplatelets individually comprise a partially-oxidized graphitic nanoplatelet. In certain configurations, the dispersion of reduced carbon nanomaterials comprising graphite oxide nanoplatelets reduced in-situ with the at least one polyol of component B comprises bulk exfoliated graphite oxide nanoplatelets comprising a thickness ranging from 1 to 20 nanometers and width ranging from 1 to 50 microns. In some embodiments, the reduced carbon nanomaterials comprise a sheet thickness less than 5 nm. In other embodiments, the dispersion of reduced carbon nanomaterials in component B comprises, as a function of a weight percent (wt. %) of a liquid volume of the at least one polyol in component B, a certain loading of exfoliated, isocyanate-treated graphite oxide nanoplatelets. In some examples, a certain loading of exfoliated, isocyanate-treated nanoplatelets in dispersion within said component B are chemically reduced in the presence of a reducing agent to provide electrical conductivity. In other examples, a certain loading of exfoliated, isocyanate-treated nanoplatelets in dispersion within said component B are chemically reduced in-situ with the at least one polyol of component B for preventing agglomeration of said nanoplatelets and retaining the dispersion over time. In some instances, the certain loading of exfoliated, isocyanate-treated nanoplatelets comprises exfoliated, single-layer graphene sheets. In other examples, the reaction mixture is curable to form an electrically-conductive composite comprising a percolation threshold on the order of 0.1 wt. % filler volume fraction from the dispersion of reduced carbon nanomaterials which form an interconnecting network of electrically-conductive paths throughout the cured reaction mixture of components A and B. In some examples, the reaction mixture is curable to form an electrically-conductive composite which comprises exfoliated, single-layer graphene sheets dispersed throughout the cured reaction mixture of components A and B. In some examples, the reaction mixture is curable to form an electrically-conductive composite comprising a percolation threshold on the order of 0.1 wt. % of reduced, polyol-treated carbon nanomaterials in liquid polyurethane component B. In other embodiments, the reaction mixture is curable to form an electrically-conductive composite which comprises specific direct current electrical conductivity levels supportive of mitigating external corrosion of underground metallic oil and gas pipeline facilities, wherein the electrically-conductive composite is configured to conduct a provided current from an impressed current cathodic protection system throughout said electrically-conductive composite. In some embodiments, the interconnecting network of electrically-conductive paths throughout the cured reaction mixture of components A and B comprises exfoliated, single-layer graphene sheets. In other embodiments, at least one polyol of component B may be selected from the group consisting of polyalkoxylated amines, polyalkoxylated ethers, and polyester polyols. In further examples, the reaction mixture may comprise water. In other examples, the reaction mixture may comprise a cell closing surfactant which provides a closed-cell content greater than 90% of total cell count. In further embodiments, the reaction mixture may comprise a catalyst. In additional examples, the reaction mixture is curable to form an electrically-conductive composite which comprises a density and compressive strength, as well as flotation resistance, to provide physical stability and inhibit erosion of trenches created for underground installation of metallic oil and gas pipeline facilities. In other examples, the reaction mixture comprises, in component B, a hydroxyl number from about 20 to about 750 and, for cell opening, a cell opening surfactant from about 0.10% to about 4.0% by weight, or, for cell closing, a cell closing surfactant from about 0.10% to about 4.0% by weight which, when cured, provides an electrically-conductive composite which comprises a density and a compressive strength that is less susceptible to precipitating pipe ovality and denting in underground carbon steel pipeline structures.

In another aspect, a reaction mixture which is curable to form polyurethane foams comprising electrical conductivity comprises: a) an isocyanate, b) at least one polyol, c) a dispersion of isocyanate-treated, chemically-reduced carbon nanomaterials, d) a blowing agent comprising improved environmental properties and optionally water, e) a cell-opening surfactant, f) a catalyst, and, optionally, g) other surfactants.

In an additional aspect, a method of producing an electrically-conductive polyurethane foam comprises forming a reaction mixture comprising (a) component A comprising an isocyanate, (b) component B comprising at least one polyol, a dispersion of reduced carbon nanomaterials, a blowing agent, and optionally, a cell-opening surfactant, and curing the reaction mixture to provide a three-dimensional composite structure which comprises a direct current electrical conductivity directly compatible with impressed current cathodic protection system functionality as employed in underground metallic oil and gas pipeline facilities.

In certain examples, the dispersion of reduced carbon nanomaterials comprises graphite oxide treated with an organic isocyanate prior to exfoliation in a liquid dispersing medium. In other examples, the dispersion of reduced carbon nanomaterials comprises isocyanate-treated graphite oxide nanoplatelets exfoliated from isocyanate-treated graphite oxide in a dispersing medium using ultrasonic mixing apparatus to provide a dispersion of functionalized graphene oxide nanoplatelets. In some embodiments, the dispersing medium comprises an organic liquid. In further embodiments, graphite oxide is treated with phenyl isocyanate prior to exfoliation in the dispersing medium. In other examples, the isocyanate-treated graphite oxide nanoplatelets in the dispersion of reduced carbon nanomaterials are reduced in the presence of a reducing agent and the at least one polyol in-situ of component B. In some instances, the carbon nanomaterials are reduced in the presence of hydrazine reducing agent, or another reducing agent. In other examples, the reduced carbon nanomaterials comprise a C/O atomic ratio greater than unreduced carbon nanomaterials. In further examples, the dispersion of reduced carbon nanomaterials comprises bulk exfoliated graphite oxide nanoplatelets comprising a thickness ranging from 1 to 20 nanometers and width ranging from 1 to 50 microns. In some embodiments, the reduced carbon nanomaterials comprise a thickness less than about 5 nm. In other examples, the dispersion of reduced carbon nanomaterials for addition to component B comprises exfoliated, isocyanate-treated nanoplatelets which is commensurate with a wt. % of a liquid volume of the at least one polyol in component B. In some examples, the exfoliated, isocyanate-treated nanoplatelets are dispersed in component B using both or either one of ultrasonic mixing and/or mechanical stirring apparatus as suitable for viscous media. In other examples, the dispersion of reduced carbon nanomaterials for addition to component B is formulated as a master batch to produce, as a function of a wt. % of a liquid volume of the at least one polyol in component B, exfoliated, isocyanate-treated nanoplatelets.

In additional examples, the master batch of exfoliated, isocyanate-treated nanoplatelets dispersed in component B comprises 2.5 wt. % or less of exfoliated, isocyanate-treated nanoplatelets in liquid polyurethane component B. In some examples, the master batch of exfoliated, isocyanate-treated nanoplatelets dispersed in component B comprises 0.4 wt. % or less of exfoliated, isocyanate-treated nanoplatelets in liquid polyurethane component B. In further examples, the master batch of exfoliated, isocyanate-treated nanoplatelets dispersed in component B comprises 0.25 wt. % or less of exfoliated, isocyanate-treated nanoplatelets in liquid polyurethane component B. In some embodiments, the master batch of exfoliated, isocyanate-treated nanoplatelets is dispersed in component B using both or either one of ultrasonic mixing and/or mechanical stirring apparatus as suitable for viscous media.

In other examples, the exfoliated, isocyanate-treated nanoplatelets in dispersion within component B are chemically reduced in the presence of a reducing agent to provide electrical conductivity. In some embodiments, the exfoliated, isocyanate-treated nanoplatelets in dispersion within component B are chemically reduced in the presence of a reducing agent and the at least one polyol in-situ of component B for preventing agglomeration of the nanomaterials and retaining the dispersion over time. In certain instances, the exfoliated, isocyanate-treated nanoplatelets are exfoliated, single-layer graphene sheets. In other instances, the reaction mixture is cured to initiate formation of chemical bonds between the reduced, partially oxygenated graphitic nanoplatelets of component B and isocyanate hard segment constituents of component A to provide graphene sheet load transfer throughout the three-dimensional composite structure. In further examples, the three-dimensional composite formation comprises a percolation threshold from the dispersion of reduced carbon nanomaterials which, comprising partially-oxidized graphitic nanoplatelets, form an interconnecting network of electrically-conductive paths throughout the cured reaction mixture of components A and B. In some examples, the three-dimensional composite formation comprises exfoliated, single-layer graphene sheets dispersed throughout the cured reaction mixture of components A and B.

In some embodiments, the percolation threshold is on the order of 0.1 wt. % of reduced, polyol-treated graphite oxide nanoplatelets in liquid polyurethane component B. In other embodiments, the interconnecting network of electrically-conductive paths throughout the cured reaction mixture of components A and B comprises exfoliated, single-layer graphene sheets. In other embodiments, the three-dimensional composite structure comprises direct current electrical conductivity levels, ranging from about 0.1 S/m up to about 1 S/m, supportive of mitigating external corrosion of underground metallic oil and gas pipeline facilities, wherein the electrically-conductive composite is configured to conduct a provided current from an impressed current cathodic protection system throughout said three-dimensional composite structure. In certain examples, the three-dimensional composite formation comprises a longitudinal resistance in relation to a given physical, longitudinal length of the cured electrically-conductive polyurethane foam which comprises reduced carbon nanomaterials electrically interconnected throughout. In some examples, the longitudinal resistance of the three-dimensional composite formation is electrically conducive to sufficient amounts of interfacial current flow, as associated with cathodic protection, at the circumferential interface of a carbon steel pipe surface and an applied electrically-conductive polyurethane foam of components A and B.

In other instances, at least one polyol of component B may be selected from the group consisting of polyalkoxylated amines, polyalkoxylated ethers, and polyester polyols. In some examples, curing of the reaction mixture is further achieved in the presence of water. In other examples, curing of the reaction mixture is further achieved in the presence of a cell closing surfactant. In some embodiments, curing of the reaction mixture is optionally achieved in the presence of a catalyst.

In additional examples, the reaction mixture comprises, in component B, a hydroxyl number from about 20 to about 750 and, for cell opening, cell opening surfactant from about 0.10% to about 4.0% by weight, or, for cell closing, cell closing surfactant from about 0.10% to about 4.0% by weight to thereby form a three-dimensional composite structure with a density and compressive strength, as well as flotation resistance, to provide physical stability and inhibit erosion of trenches created for underground installation of metallic oil and gas pipeline facilities.

In some examples, the reaction mixture comprises certain hydroxyl ranges applicable to foam physical characteristics and is cured in the presence of certain cell closing and cell-opening surfactants to provide a three-dimensional composite structure with a density and compressive strength to provide physical stability under field conditions comprising physical loads associated with hydrostatic testing. In other examples, the reaction mixture comprises certain hydroxyl ranges and is cured in the presence of certain cell closing and cell-opening surfactants to provide a three-dimensional composite structure with a density and a compressive strength that is less susceptible to precipitating pipe ovality and denting in underground carbon steel pipeline structures.

In some embodiments, curing the reaction mixture of components A and B produces a three-dimensional composite formation which, on a collective basis, comprises a density, compressive strength, storage modulus, damping factor, and Young's modulus optimized for large-diameter pipelines on the order of from 36.0 in. diameter up to 42.0 in. and larger.

In certain examples, curing of the reaction mixture is initiated by mixing components A and B via high-pressure spray application. In other examples, high-pressure spray application to initiate curing of the reaction mixture comprises spraying said components A and B to form a three-dimensional composite structure comprising at least one of an electrically-conductive polyurethane foam pad, pillow, or trench breaker for use in underground oil and gas pipeline facilities construction. In some embodiments, spraying said components A and B to cure the reaction mixture comprises an electrically-conductive polyurethane foam directly compatible with impressed current cathodic protection system functionality wherever the foam contacts the metallic pipe. In other embodiments, spraying said components A and B to form a three-dimensional composite structure comprises an electrically-conductive polyurethane foam in at least one of a pad, pillow, or trench breaker formation which, as it physically contacts or may encircle an installed pipe, comprises a direct current electrical conductivity directly compatible with impressed current cathodic protection system functionality as employed in underground metallic oil and gas pipeline facilities. In certain examples, high-pressure spray application to initiate curing of the reaction mixture comprises spraying said components A and B directly on and around an underground metallic pipe structure in place.

In some examples, spraying said components A and B directly on and around an underground metallic pipe structure in place comprises an electrically-conductive polyurethane foam in a three-dimensional composite structure which, as it physically contacts and encircles the sprayed pipe, comprises a direct current electrical conductivity directly compatible with impressed current cathodic protection system functionality as employed in underground metallic oil and gas pipeline facilities.

In other examples, curing of the reaction mixture to provide an electrically-conductive polyurethane foam compatible with impressed current cathodic protection system functionality, as employed in underground oil and gas pipeline facilities, comprises foaming the reaction mixture of components A and B. In some embodiments, curing of the reaction mixture comprises combining components A and B as applicable to pre-formed molding apparatus to provide a fully-cured composite foam structure, comprising at least one of an electrically-conductive pad, pillow, trench breaker, outer pipe jacket, interlayer cylindrical jacket, or some other formative shape as a protective barrier, even including a flexible, roll-based blanketing material, as any one of the respective foam formations is fundamentally aligned for use in underground oil and gas pipeline facilities corrosion mitigation due to the composite foam's incorporated electrical conductivity characteristics which can be rendered directly compatible with impressed current cathodic protection system functionality.

In another aspect, a method of producing polyurethane foams providing electrical conductivity comprises reacting: a) isocyanates with b) polyols in the presence of c) dispersions of isocyanate-treated, chemically-reduced carbon nanomaterials, d) blowing agents, e) cell-opening surfactants, and f) catalysts.

In an additional aspect, a method of supporting and protecting buried metallic pipeline structures comprises (a) inserting into a trench in which, or to which, a pipeline is to be or has been placed, a composition comprising a thermoset, rigid polyurethane foam wherein said composition comprises hydroxyl group crosslinking as applicable to foam physical characteristics, and chemical bonding with incorporated carbon nanomaterials via reaction between polyurethane chain-end isocyanate groups and oxygenated groups on the carbon nanomaterials to provide a composition electrically compatible with impressed current cathodic protection systems that are integral to corrosion mitigation for underground oil & gas pipeline infrastructure, and (b) backfilling the trench after the foam and the pipeline has been inserted into the trench.

Additional aspects, examples, embodiments and configurations are described further below.

BRIEF DESCRIPTION OF THE SEVERAL VIEWS OF THE DRAWINGS

Certain configurations of compositions and methods are described below with reference to the accompanying figures in which:

FIG. 1 is a pipeline comprising a sprayed polyurethane foam as described herein.

DETAILED DESCRIPTION

In certain embodiments described herein, carbon nanomaterials can provide thermal and electrical conductivity properties for advanced materials development in a variety of important end-use applications. When incorporated into a polymer matrix, for instance, carbon-based nanomaterials, apart from their beneficial thermal attributes, can increase electrical conductivity by orders of magnitude over the performance possible with traditional fillers such as carbon black or metal powders. In fact, when it comes to the tremendous application potential of graphene, this respective nanofiller can be preferred even over carbon nanotubes. Any such material preference toward graphene may be attributed to, for instance, high aspect ratio, high surface area, favorable mechanical attributes, thermal conductivity, electrical conductivity, flexibility, and gas barrier qualities as well.

In certain examples, one end-use application of particular interest for novel materials development is the "tuned" incorporation of graphene within, for instance, geotechnical-class spray polyurethane foam (SPF) compositions as employed today for "high-throughput" construction of new underground oil & gas pipelines. More specifically, these thermoset (i.e.—rigid) SPF compounds can facilitate the construction and/or placement of new underground pipelines in terms of serving as three-dimensional "pads" and/or "pillows" which, as sprayed directly on and around an underground structure in-place, may physically support, stabilize, and protect the carbon steel structure as placed in an underground trench. These same rigid polyurethane foam compounds can further be spray applied to produce "trench breakers" which as applied in intermittent locations along an underground trench—may negate erosion of the trench created for installing a particular underground hazardous liquid or natural gas pipeline facility.

In some examples, the expanding use of geotechnical SPF materials to aid in the construction of new pipelines is understandable. These high-performance foam systems can serve pipeline owners and their contractors well. These plural-component, continuous-lift SPF materials can enable easier pipeline installations, and they further save considerable money for all involved. The proficient installation of these broadly-enabling foam materials offers several attributes with respect to: (1) reduced labor costs, (2) reduced risk of employee injury (and even death) versus use of sandbags, and (3) increased productivity resulting from much faster job site completion. Minimum Federal Safety Standards (49 CFR, Part(s) 192/195) for corrosion control on buried structures, stipulate that metallic pipelines must be properly coated and have impressed-current cathodic protection (ICCP) systems in place (i.e.—which were first deployed in 1940). All pipeline coatings contain some defects and deteriorate over time. Every coating system has a finite lifespan and eventually degrades, thus allowing oxygen, water, and chemicals to reach the metallic substrate underneath. This is precisely the point at which the protective current (DC) of an applicable ICCP system is available, as designed, to safeguard such bare steel areas from corrosion. The ability of ICCP to reliably alter (and control) the electrical potential field around a protected pipe is critical to the effective long-term mitigation of corrosion in buried pipelines. ICCP has proven highly effective for corrosion control by not only rendering the steel structure as the cathode, but further increasing the pH of the electrolyte (or soil) at the pipe surface (or at coating defects) as well.

Electrically-conductive polyurethane-graphene (ECPG) composites are described herein and may comprise the incorporation of carbon nanoparticles within, for instance, primarily chemically- and partially water-blown spray polyurethane foam (SPF) compositions as utilized in, for instance, the construction of new underground oil & gas pipeline facilities. High-performance SPF compounds, when reacted, can facilitate the construction of new underground pipelines in terms of serving as pipeline "pads" and/or "pillows." As sprayed directly on and around an underground structure in-place (see FIG. 1), these reacted polyurethane compositions can physically support, stabilize, and protect carbon steel pipes as placed in an underground trench. In addition, these rigid polyurethane foam systems can serve as "trench breakers" in which sprayed columns of polyurethane material, in multiple locations along an underground trench, may negate erosion of the trench created for installing a particular hazardous liquid or natural gas pipeline facility.

In some instances, the polymeric materials associated with polyurethanes form a family of polymers which are essentially different from most other plastics in that there is no urethane monomer, e.g., the materials are substantially polymer; the polymer is provided during the manufacture of a particular object, or three-dimensional formation or structure. As such, polyurethanes can be produced by exothermic reactions between alcohols with two or more reactive hydroxyl (—OH) groups per molecule (diols, triols, and polyols) and isocyanates that have more than one reactive isocyanate group (—NCO) per molecule, e.g., monoisocyanates, diisocyanates and polyisocyanates. For instance, a diisocyanate may react with a diol wherein the group formed by the reaction between the two molecules is known as the "urethane linkage." The physical properties, as well as the chemical structure, of a polyurethane depend, at least in part, on the structure of the original reactants, in particular the side chain moieties which are often the reactive groups. The characteristics of the polyols—per the relative molecular mass, the number of reactive functional groups per molecule, and the molecular structure—can influence the properties of the final polymer, and therefore how it is used.

One particular material attribute that can impart significant differences in how a particular thermoset SPF composition may be used is the applicable level of closed cell-versus open-cell content associated with a given foam. While the reaction of polyols with isocyanates (along with applicable blowing agents) may lead to a multitude of differing end results, the fundamental and field-related characteristics of closed- and open-cell foams can address similar needs, yet they can differ greatly.

In some examples, closed-cell foams are usually more dense than open-cell foams. Closed-cell foams weighing between 1.7 and 2.0 lbs/ft$^3$ are known, yet material densities applicable to geotechnical SPF compositions generally tend to weigh around 2.2 lbs/ft$^3$. With closed-cell foams, a majority of the cells comprise independent, tightly-packed cell structures that are in absence of any interconnection with other foam cells. The resulting foam has a much higher plastic content than open-cell foams, wherein entrapped gas formed during the foam's expansion and curing is contained among the cell structures. As such, the entrapped gas increases the barrier protection capabilities of the cured foam. Within industry, the general definition applicable to closed cell foam is that, once again, greater than 90% of the cells are closed, e.g., the void content is 10% or less. As such, certain characteristics of closed-cell foams typically include: (1) a strong, rigid composition, (2) a greater compression strength versus open-cell foams, (3) a highly-robust supportive structure versus open-cell foams, and (4) a distinct presence of barrier protection against, for instance, moisture, free water, and/or oxygen ingress.

The structure of open-cell foams typically results in lighter foam densities versus closed-cell compounds. Open-cell polyurethane foams weighing on the order of less than 0.50 to 0.60 lbs/ft$^3$ are known, yet material densities applicable to geotechnical SPF compositions specified between approximately 1.30 lbs/ft3 and 3.5 lbs/ft3 are known just the same. In an open-cell foam, the cells of the foam do not close completely, and they connect with each other, wherein the cell structures formed are in absence of any entrapped gas which is released to the atmosphere during foam expansion and curing. The spaces among the interconnected cells are thereby filled with air, much like a sponge in which water can easily flow through the entire structure. The general designation in industry for open-cell foams is that, once again, greater than 50% of the cells are open. In this case, certain characteristics of open-cell foams typically include: (1) a soft, spongy composition, (2) a reduced compression strength versus closed-cell foams, (3) a diminished supportive structure versus closed-cell foams, and (4) a distinct absence of barrier protection against, for instance, moisture, free water, and/or oxygen ingress.

From a field-level perspective, spray polyurethane foam is produced, as specified above, from a mixture of fast-reacting polyols with isocyanates (along with applicable blowing agents) combined in a special plural-component, impingement-mix air spray gun at the moment of application. ++If the polyol (i.e.—a thermoset) has more than two reactive hydroxyl groups, adjacent long-chain molecules become linked at intermediate points. These crosslinks create a stiffer polymer structure with improved mechanical characteristics which is exploited in the development of "rigid" polyurethanes. To this end, a diisocyanate, such as methylene diphenyl diisocyanate (MDI) or toluene diisocyanate (TDI), which reacts with a polyol with three hydroxyl groups thereby undergoes crosslinking and forms a rigid thermosetting polymer. Applicable foam density with rigid compositions can be adjusted to suit particular field applications. Whether fundamentally categorized as either closed-cell (medium-density) or open-cell (low-density), geotechnical-class SPF compositions are classified as thermoset resins formulated to comprise millions of small cells.

And, as they may be spray applied, these high-performance polyurethanes, as already noted, can be reacted with underground pipelines in-place. As such, geotechnical SPF compositions can conform to any trench configuration, or other geotechnical condition, that a particular application may require. With most geotechnical SPF products, the reactionary mixture of the fast-reacting polyols and isocyanates allows the foam to build up on itself during a continuous-lift installation without excessive pooling or blowback. These particular foam compositions typically further involve a low-exothermic reaction temperature and thus can be applied in a single continuous lift at substantial thicknesses without danger of charring or ignition. The fast-reacting polyols and isocyanates also cream rapidly and quickly achieve both full rise, and a tack-free surface, in a short period of time.

A listing of ASTM physical test methods applicable to rigid polyurethane foams encompasses: (1) "ASTM D1621: Standard Test Method for Compressive Properties of Rigid Cellular Plastics," (2) "ASTM D1622: Standard Test Method for Apparent Density of Rigid Cellular Plastics," (3) "ASTM D1623: Standard Test Method for Tensile and Tensile Adhesion Properties of Rigid Cellular Plastics," (4) "ASTM D2842: Standard Test Method for Water Absorption of Rigid Cellular Plastics," (5) "ASTM D2856: Standard Test Method for Open Cell Content of Rigid Cellular Plastics By the Air Pycnometer," (6) "ASTM D6226: Standard Test Method for Open Cell Content of Rigid Cellular Plastics [Gas Pycnometer]," and (7) "ASTM D3576: Standard Test Method for Cell Size of Rigid Cellular Plastics," all publications of which are specified hereto as reference (American Chemistry Council, Inc. 2016). The respective test standards (i.e.—procedures) may thus be referred to as related to any innovative polyurethane materials development wherein empirical test results relevant to a particular ASTM standard (or multiple standards) may be cited as applicable to, for instance: (1) material density, (2) compressive strength, (3) storage modulus, (4) damping factor, and (5) Young's modulus—all as mechanically and/or physically applicable to constituent materials optimization for large-diameter pipelines on the order of from 36.0 in. diameter up to 42.0 in. and larger.

The long-term integrity of underground pipeline infrastructure continues to be a significant concern for all pipeline owners and contractors. In fact, there has recently been an increased emphasis on a variety of methods employed toward an initial protective means of avoiding any coating damage as a given string of pipe is lowered into a trench that may contain individual protruding rocks and/or extended sections of rock. Even as current-day pipeline joints are protected with tough, epoxy-based external coatings, additional protection is often necessary to accommodate such conditions as a rock-laden trench bottom.

Historically, ahead of actual lowering of a pipeline string into a trench, additional external pipe protection (along with physical support) has been accomplished in accordance with, for instance, intermittent placement of sand piles, or clean backfill, and sand bags deployed along the trench bottom to avoid any damage of the placed string of pipe.

The intermittent use of sand piles and/or sand bags, especially for larger pipelines, is labor intensive and can oftentimes be associated with contributing to pipeline ovality and/or denting of the underground structure when improperly placed. What's more, requiring installation personnel to actually enter the trench, hand placement of sand bags, or pre-formed (i.e.—fully-cured) pipe supports, is inherently unsafe, even sometimes leading to employee deaths in some unfortunate instances. This undesirable situation, along with a number of other field-related use characteristics, supports that use of SPF materials instead of, for instance, physical-labor-intensive sand bag deployments is a better solution.

Reacted polyurethanes applicable to supportive pipeline pads and trench breakers typically exhibit low permeability and high chemical resistance, thus owing to their attractiveness in serving (along with external coating technologies) as barrier coatings against moisture, oxygen, and other chemicals contacting the steel pipe surface. And, applied polyurethanes inherently present a high electrical resistance that, for foams still completely intact with a given steel substrate, effectively serves (if coating degradation is present) to prevent the formation of corrosion cells on the respective steel substrate underneath. As decisively noted above, however, underground pipeline support achieved via spray application of geotechnical foam products is directly linked to unacceptable shielding of CP currents as a given polyurethane column typically envelopes the carbon steel pipe. It has further been reported in industry that customary spray-applied polyurethane foams shield CP currents wherever they contact a given pipe (e.g.—not in a fully-enveloping foam application, but a single "underside" foam pillow installment). This situation, too, likely due to reduced labor inputs and profit-driven motivations, has predominately been ignored by most stakeholders in the Oil & Gas pipeline industry. This insidious situation is of great concern from a long-term corrosion perspective, to be sure. In short, physically-disbonded foam columns, as associated with continued pipeline movement, may not only (along with resultant coating disbondment) precipitate localized corrosion of external pipe surfaces, but ultimately exacerbate it as any entrapped moisture beneath the foam may remain in the immediate presence of what will eventually become an exposed bare metal substrate.

There are other material concerns, too, with respect to the field-level mechanical behavior of rigid polyurethane foam compositions. In some cases, improper foam formulations with inadequate compressive strength may be associated with excessive physical compression of supportive pipeline pads, perhaps eventually leading to situations in which structural integrity issues would become a legitimate concern as associated with excessive compression under heavy loads. And, conversely, overly-rigid polyurethane foam compositions, in absence of a certain level of yield behavior of energy (e.g.—higher-density formulations), are likely the predominate contributors to ovality and denting of certain underground structures. Occurrences of mechanical deformations to this extent may very well point to intermittent spray foam formations in which the lateral surface area of the foam pads is insufficient for the load bearing requirements at hand. This field-level concern is itself potentially of great significance in the case of the expanding construction of oil & gas pipelines on the order of 36.0"-42.0"—as these large-diameter pipes have been reported to be most susceptible to ovality and denting when supported by some existing geotechnical SPF products.

Moreover, in some cases, existing polyurethane foams employed in trench breaker formations to prevent erosion have been known—in absence of a certain level of open-cell content—to float and rise under heavy rain conditions wherein water may fill the open pipe trench (prior to backfill). Such field conditions may potentially result in excessive movement and even cracking of installed underground oil & gas pipeline.

From a different, yet integral materials-driven perspective, many have noted, at one time or another, how carbon nanotubes (CNTs) have been considered as a nanofiller to improve either mechanical, thermal, and/or electrical properties of various polymers. More recently, however, the role of CNTs in polymer nanocomposites has been strongly challenged by much cheaper graphene sheets, which have quite similar properties to CNTs (Geim and Novoselov 2007).

Graphene is considered a two-dimensional carbon nanofiller with a one-atom-thick planar sheet of sp2 bonded carbon atoms that are densely packed in a honeycomb crystal lattice. It is regarded as the "thinnest material in the universe" with, once again, tremendous application potential (Geim and MacDonald 2007).

In certain examples, polyurethanes having tunable physical properties are described herein and foam production methods using them are presented herein. To this end, a remarkable level of interest in the development of various polymer-graphene nanocomposites has intensified greatly over the last ten years. The full extent of research that's been reported for high-performance polymer-graphene nanocomposites is seemingly every bit as diverse and far-reaching as the well-documented chemistry of polyurethanes (since 1937) is itself.

One important "mainstay" associated with advances in polymer-graphene nanocomposites research is that viable realization of such desired materials can be accomplished not on the basis of pristine graphene, but graphite oxide (GO)—that is, a fundamental precursor to graphene nanoplatelets. Graphite Oxide is an oxygen-rich, carbonaceous, layered material produced by the controlled oxidation of natural graphite (Brodie 1860, Staudenmaier 1898, and Hummers and Offeman 1958). One of the more popular resources that describes such oxidative treatment to produce GO is described, by reference, by Hummers et al in J. Am. Chem. Soc. 1958, 80, 1339. Each layer of GO is essentially an oxidized graphene sheet which is thereby also commonly referred to as graphene oxide (Hirata 2005).

Studies directed toward physical and chemical characterization of oxygen-containing groups in GOs were first initiated as early as 1995. Based on various results of these studies, multiple prior researchers indicated that GO consists of intact graphitic regions interspersed with sp3-hybridized carbons containing hydroxyl and epoxide functional groups on the top and bottom surfaces of each sheet—and sp2-hybridized carbons containing carboxyl and carbonyl groups mostly at the sheet edges (Szabo et al 2005, Lerf et al 1997, Lerf et al 1998, Hontoria-Lucas et al 1995, He et al 1996, and He et al 1998). In this case, GO is hydrophilic and readily disperses in water to form stable colloidal suspensions. Together, the versatility of polyurethanes and graphene oxide alike should thus prove conducive to the robust synthesis of highly-performing polyurethane-graphene nanocomposite systems.

Stankovich et al thus specified a distinct interest—as of January 2006—in developing and using graphene-based nanoplatelets as a well-dispersed filler for a broad range of polymer composites (Stankovich et al 2006). In particular, the platelet shape—via exfoliation of graphite—was suggested to offers edges that are easier to modify chemically for enhanced dispersion in polymers. The Stankovich group suspected that GO would serve as an excellent precursor to a variety of graphene-based nanofillers if it could be completely exfoliated in a wide range of media. In one instance, GO readily exfoliated in water under a mild ultrasonic treatment to produce transparent dispersions that were stable for at least months at concentrations of 1 mg/mL (Stankovich et al 2005). Atomic force microscopy (AFM) indicated that these dispersions contained GO nanoplatelets of about 1 nm uniform thickness.

Since GO is hydrophilic, graphene sheets are not directly conducive to direct exfoliation into non-aqueous solvents. According to Stankovich et al, this behavior can presumably be attributed to the strong interlayer hydrogen bonds between the oxygen functional groups of adjacent graphene oxide layers in GO. Unlike water, organic solvents are unable to penetrate the interlayer spaces of GO and disrupt these hydrogen bonds, which in turn prevents their exfoliation. If the density of the hydrogen bond donor groups, such as hydroxyls, is decreased via chemical functionalization, the graphene oxide layers would become less hydrophilic and the strength of interlayer hydrogen bonding will be attenuated, thus possibly allowing for exfoliation in organic solvents. At the time, other researchers had shown that specific functionalization of GO was possible; yet the exfoliation behavior of such chemically-modified GOs had never been studied to this extent.

As such, Stankovich et al investigated—still as of January 2006—the synthesis of chemically-modified GO derivatives via treatment of GO with aryl and alkyl isocyanates. Dispersions of GONPs were formed by exfoliating GONPs from bulk GO in an organic liquid dispersing medium using ultrasonic energy. First, bulk GO was prepared via Hummers method using commercially-available bulk graphite from, in this case, Bay Carbon (Bay City, Mich.). In short, SP-1 graphite was subjected to an oxidative treatment with potassium permanganate (KMnO4) in concentrated sulfuric acid.

Once dried, the bulk GO was treated with an organic isocyanate prior to additional exfoliation as applicable. According to Stankovich et al, the isocyanate-treated GO could thereby be exfoliated in a polar aprotic solvent to provide a stable dispersion of functionalized GONPs. Continued solution phase processing of the dispersions generally involved steps wherein, for instance, 50 mg of GO was first suspended in 5 ml anhydrous N,N-dimethylformamide (DMF) and subsequently treated with 2 mmol phenyl isocyanate for 24 hrs. prior to recovery by filtration as applicable. Stable dispersions of the resultant phenyl isocyanate-treated GO materials were then prepared by ultrasonic exfoliation (1 hr. at 150 W) in DMF (1 mg/mL) as similarly described above.

Stankovich et al. demonstrated, for the first time, that such chemical treatment can dramatically alter the exfoliation behavior of GO. The respective treatment thus enabled the complete exfoliation of GO into individual chemically derivatized graphene oxide sheets to be achieved in an organic solvent. In stark contrast to the unmodified GO tested, the group's isocyanate-treated graphite oxide (ITGO) did not disperse at all in water. Instead, it swelled. Yet, after a brief ultrasonic treatment not in water, but in a proper organic solvent medium, the ITGO readily formed stable colloidal dispersions in polar aprotic solvents such as DMF, N-methylpyrrolidone (NMP), dimethyl sulfoxide (DMSO), and hexamethylphosphoramide (HMPA). It was further reported that other less polar solvents, such as tetrahydrofuran (THF), acetone, methylene chloride, and toluene, or common polar protic solvents, such as methanol and ethanol, did not disperse the ITGO materials. Test results for the prepared sample dispersions of Stankovich were highlighted in accordance with: (1) unmodified GO in DMF, (2) phenyl isocyanate-treated GO in water, and (3) phenyl isocyanate-treated GO in DMF (i.e.—at 1 mg/mL concentration). As presented, the sample vials with unmodified GO in DMF and phenyl isocyanate-treated GO in water contained visible precipitates, thus indicating poor dispersion. On the other hand, the dark brown dispersion of the phenyl isocyanate-treated GO in DMF contained no visible precipitates and was stable for weeks. According to Stankovich et al, the treatment of GO with organic isocyanates supported the derivatization of both the edge carboxyl and surface hydroxyl functional groups via formation of amides (Blagbrough 1986) or carbamate esters (Smith and March 2001), respectively (Stankovich et al 2006).

Chemical functionalization of graphene has proven to be a particularly attractive measure because, as later revealed, it can improve material solubility and processability, as well as enhance important interactions with organic polymers (Worsley et al 2007 and Niyogi et al 2006).

The incorporation of individual graphene sheets—at just one atom thick—in a composite material was largely brought to the forefront by Stankovich et al in July 2006. The principal thrust of this new work by Stankovich was directed not only toward the chemical modification of graphene, but how these graphitic materials might be incorporated in a host polymer matrix—that is, in order to capitalize on what was projected to present extraordinary electronic transport properties. To this end, any viable large-scale production of such composites would require that graphene sheets not only be produced on a sufficient scale, but that they also be incorporated, and homogeneously distributed, into a variety of different matrices. From a commercial viability standpoint, it was duly noted that graphite is inexpensive and available in large quantities. Once again, however, it was noted that the exact process by which graphite (or GO) could be readily exfoliated to yield individual graphene sheets was imperative for the realization of homogeneous nanoplatelet dispersions (Stankovich et al 2006).

Stankovich et al thus pursued a general approach for the preparation of polymer-graphene nanocomposites via complete exfoliation of graphite and molecular-level dispersion of individual, chemically modified graphene sheets within a polymer host. With emphasis on a thermoplastic polystyrene, preparation of sample composites reinforced by graphene sheets incorporated and homogeneously distributed within the respective polymer matrix was demonstrated by Stankovich.

The respective polystyrene-graphene composites can generally be produced in a manner very similar to what was specified above for the realization of stable colloidal dispersions of GONPs in different organic solvent media via chemical modification with phenyl isocyanate. In the particular case at hand, though, the isocyanate-treated dispersions of GONPs can be (again via solution phase processing) additionally subjected to a chemical reduction treatment in the presence of a reducing agent (with DMF) and added polystyrene polymer (as dissolved with stirring).

Reduction of the dispersed GO material can be carried out with dimethylhydrazine reducing agent (0.1 ml in 10 ml of DMF) at 80° C. for 24 hrs. The GONPs in solution can thereby be reduced to an extent to provide a higher C/O ratio than graphite oxide. Stable dispersions having reduced, polymer-treated GONPs dispersed in a dispersing medium, such as organic liquid, can be successfully realized.

Upon completion of the reduction step, coagulation of the polymer composites is accomplished by adding the DMF solutions dropwise into a large volume of vigorously stirred methanol (10:1 with respect to the volume of DMF used). The coagulated composite powder can be isolated via filtration; washed with methanol (200 mL); dried at 130° C. under vacuum for about ten hours to remove residual solvent, anti-solvent, and moisture; crushed into a fine powder with a mortar and pestle, and then pressed in a hydraulic hot press at 18 kN with a temperature of 210° C. Subsequent applicable processing, the reduced (and polymer-treated) GONPs can be thoroughly distributed in the polystyrene matrix to thereby afford a graphene-loaded composite material with dramatically-improved electrical properties.

Stankovich notes that at 2.4 volume percent (vol. %) loading of the functionalized, reduced graphene sheets, the produced composites appeared in SEM images to be almost entirely filled with the incorporated graphene sheets, even though 97.6 vol. % was actually filled by the polymer. This "visual" effect was suggested to be due to the enormous surface area of the graphene sheets. Stankovich et al further described how it was imperative that the presence of the polymer in solution during the reduction step was desirable to preventing agglomeration of the sheets. As such a reduction proceeded, the sheets may become coated with the polymer and remained individually dispersed. The respective composites, as processed, can feature individual graphene sheets well dispersed throughout the polymer matrix. Conversely, when the reduction step precedes the introduction of the polystyrene, significant agglomeration of graphene sheets may occur. The Stankovich et al work verified that chemical reduction is desirable for inducing electrical conductivity, as composite samples with un-reduced, phenyl isocyanate-treated GO sheets can generally be insulating.

The conductive nature of the graphene filler motivated Stankovich et al to study the percolation behavior of the produced composites through electrical measurements. As a control, polystyrene composites containing phenyl isocyanate-treated GO sheets that were not chemically reduced were prepared by Stankovich. At similar graphene concentrations, these samples were gray in color compared to the almost black composites filled with the reduced GO material, and they were not electrically conductive. The polystyrene-graphene composite formed by the demonstrated production approach in Stankovich exhibited a percolation threshold of approximately 0.1 vol % for room-temperature electrical conductivity, the lowest reported value for any carbon-based composite except for those involving carbon nanotubes. This percolation was three times lower than that reported for any other two dimensional fillers due to the homogeneous dispersion and extremely large aspect ratio (width vs. height) of graphene. At a loading of approximately 0.15 vol. %, the conductivities of the composites were suggested to have already satisfied the antistatic criterion (10-6 S/m) for thin films.

The conductivity of each respective composite can exhibit a rapid increase over a 0.4 vol. % range, whereas an increase in graphene sheet loading above 0.5 vol. % can yield a more gradual increase in electrical conductivity. At just 1.0 vol %, the produced composites can exhibit a conductivity of approximately 0.1 S/m—that is, a level sufficient for many electrical applications. The produced composites with 2.5 vol. % graphene loading can provide conductivities of roughly 1 S/m.

The electrical properties of the respective polystyrene nanocomposites can be compared with the best values reported in the literature for polymer nanocomposites incorporating carbon nanotubes. Graphene sheets have higher surface-to-volume ratios than single-walled carbon nanotubes (SWCNTs) owing to the inaccessibility of the inner nanotube surface to polymer molecules. In this case, graphene sheets potentially can prove more favorable than SWCNTs for altering, in addition to electrical conductivity, other important material aspects such as significant improvement to thermal and mechanical properties performance. Overall, the bottom-up chemical approach toward tuning critical graphene sheet properties was suggested to afford a specific path to a broad new class of graphene-based materials and their use in a variety of applications (Stankovich et al 2006).

It bears noting as well that Stankovich later noted that pristine graphene materials are inherently unsuitable for intercalation by large species, such as polymer chains, because graphene as a bulk material has a pronounced tendency to agglomerate in a polymer matrix (Stankovich et al 2007). Others then later verified as well that oxidation followed by chemical functionalization can indeed facilitate the dispersion and stabilization of graphene to prevent such nanoparticle agglomeration (Geng et al 2009 and Wei et al 2009).

Currently, Hummers' method (KMnO4, NaNO3, H2SO4) is the most common method used for preparing graphite oxide (GO). Other methods of improved synthesis of GO are also known as applicable to the production of polymer nanocomposites with certain improved performance attributes. For instance, Marcano et al have found that excluding the NaNO3, increasing the amount of KMnO4, and performing the reaction in a 9:1 mixture of H2SO4/H3PO4 improves the efficiency of the oxidation process. This improved method provides a greater amount of hydrophilic oxidized graphene material as compared to Hummers' method, or Hummers' method with additional KMnO4. Moreover, even though the GO produced by the respective method is more oxidized than that prepared by Hummers' method, as both are reduced in the same chamber with hydrazine, chemically-converted graphene produced from this new method is equivalent in its electrical conductivity. Very importantly, in contrast to Hummers' method, the Marcano et al method does not generate toxic gas, and the temperature is easily controlled. Marcano et al further suggested that this improved synthesis of GO could prove important for large-scale production of GO (Marcano et al 2010).

Fernandez-Merino et al have also reported that vitamin C is an ideal substitute for hydrazine in the reduction of GO suspensions. The preparation of graphene from GO via solution processing techniques typically involves a hydrazine reduction step, but the use of such a reagent in the large-scale implementation of this approach is not desirable due to its high toxicity. The respective development effort compared the deoxygenation efficiency of GO dispersions by different reductants (i.e.—sodium borohydride, pyrogallol, and vitamin C, in addition to hydrazine), as well as by heating the suspensions under alkaline conditions. More often than not, the degree of reduction attainable and the subsequent restoration of relevant properties (e.g.—electrical conductivity) lag significantly behind those achieved with hydrazine. Quite interestingly, only vitamin C is found to yield highly-reduced suspensions in a manner comparable to those yielded by hydrazine. Stable dispersions of vitamin C-reduced GO can be prepared not only in water, but also in common organic solvents, such as DMF or N-methyl-2-pyrrolidone (NMP). Fernandez-Merino et al suggested that their results offer an important opportunity for replacing hydrazine in the reduction of GO dispersions by an innocuous and safe reductant of similar efficacy. Very importantly, the respective researchers further specified that their work surrounding vitamin C could readily facilitate the use of graphene-based materials for large-scale applications (Fernandez-Merino et al 2010).

Not long after publication of the Stankovich et al work, graphene was predicted, once again, to have remarkable properties, such as high thermal conductivity, superior mechanical properties, and excellent electronic transport properties (Wang et al 2008, Blake et al 2008, Li et al 2008, Wang et al 2009, Dreyer et al 2010). A theoretical study by Xie et al actually predicted that graphene should prove more effective for conductivity improvement than competing nanofillers such as CNTs because of its large specific surface area. In particular, it was suggested by these authors that an outstanding electrically-conductive polymer-graphene composite is expected to have a lower percolation threshold and higher conductivity at a lower graphene loading, which can not only decrease the cost of filler but also preserve the processability of the composite (Xie et al 2008).

Cai et al have reported on significant mechanical properties enhancement of polyurethane (i.e.—polyether polyol) using GONPs. The overall emphasis of this work was fundamentally directed toward application of such composite materials to high-performance surface coatings (Cai et al 2009). First, the respective group pointed to the difficulty associated with stripping graphene sheets from graphite due to the strong bonding between the sheets. Introduction, by means of strong oxidation, of oxygenated groups into graphite can favorably reduce this mutual bonding, thus allowing the exfoliation of GO in water by assistance of ultrasonication (Titelman et al 2005). As specified in the Stankovich et al work, however, Cai et al also recognized that GO generally could not be exfoliated in organic solvents.

The manner in which Stankovich et al used phenyl isocyanate to terminate oxygenated groups in GO and achieved single-layer, isocyanate-functionalized graphene sheets in DMF should be noted. The specific means by which Stankovich et al employed hydrazine reducing agent (over 24-hr. period) to subsequently deoxygenate the GO nanoplatelets—in the presence of the host organic polymer—can provide a homogeneous (agglomerate-free) inclusion of graphene that can be achieved for an electrically-conductive polystyrene composite. Furthermore, Cai et al keenly pointed to the fact that—as a result of the chemical reduction step—the destructive carbon structure of the isocyanate-functionalized graphene sheets was chemically restored to thereby improve the electrical conductivity characteristics of the graphitic nanoplatelets.

The respective research actually focused on expandable graphite (EG) produced by intercalating sulfuric acid into natural flaked graphite (E.G.—versus graphite powder) via chemical or electrochemical processes. It was further noted that, as a graphite intercalation compound, expandable graphite can expand up to a hundred times in volume at high temperature (Cai et al 2009). A previous report by D. Cai and M. Song in fact specified that graphite oxide (GO) prepared by the oxidation of EG can be readily exfoliated into GONPs in DMF (i.e.—presumably in absence of prior isocyanate modification) by ultrasonication directly (Cai et al 2007). This type of GO was specifically referred to as 'expandable graphite oxide' (EGO) such that it could be differentiated from GO prepared from natural graphite (or, say, bulk graphite powder).

Many prior research efforts have recognized that two primary concerns need to be addressed in the preparation of polymer composites for nearly any preferred material performance requirement: (1) an homogeneous dispersion of nanofillers in a host polymer matrix; and (2) a strong interface between nanofillers and a host polymer matrix. In this case, Cai et al noted how oxygenated groups attached to the GONPs (i.e.—thru prior isocyanate modification) can not only facilitate dispersion, but also provide active sites to form chemical bonding that is an ideal interface between the GONPs (versus EG) and an applicable host polymer (Cai et al 2009).

The actual polyurethane (PU) employed in the respective work was specified as a compound comprising both a 6000 molecular weight polyether polyol (PPG-6000) and a 4000 molecular weight polyether polyol (PPG-4000). After oxidation of EG as noted above, a dispersion of GONP/DMF can be achieved by exfoliating 100 mg EGO in 10 g DMF via ultrasonic means at a power of 300 W for 30 min. at room temperature. According to Cai et al, the PU/GONP composites can be solution processed by mixing self-prepared, isocyanate-terminated polyurethane and the GONPs in DMF. More specifically, preparation of the PU/GONP composites may involve stirring 1.5 g PPG-6000, 6 g PPG-4000, 0.8 g 1.4-Butanediol (BDO), 3.89 methyl diphenyl diisocyanate (MDI), and 0.11 g dibutyltin dilaurate (DBTL) catalyst in DMF at 600 C for 24 h in a four-necked flask protected by N2. The PU/DMF solution itself may comprise a 40 wt % solid content. And, lastly, a calculated amount (4.4 wt % in the case at hand) of the GONP/DMF dispersion can be mixed with the PU/DMF solution at 800 C for another 1 h. Quite interestingly, Cai et al further noted that a two-week drying process at 500 C can be a final last step required for the preparation of the respective PU/GONP composites.

The dispersion of the GONPs in the PU matrix can proceed without any difficulties since, as noted above, previous work performed by Cai et al was deemed successful in terms of having fully exfoliated GONPs (via flake graphite) in DMF. Very importantly, the PU can be an appropriate "host" polymer in that it forms the necessary chemical bonds with the GONPs via reaction between the isocyanate groups in the end of the PU chains and the oxygenated groups on the GONPs. Due to the formation of chemical bonding, there can be a strong interaction between the GONPs and the hard segment of the PU, which allows effective load transfer.

The improvement in mechanical properties associated with the graphene-based composites described herein can be qualified in the context of: (1) storage modulus (or elastic energy), (2) damping factor and damping capacity, (3) Young's modulus (stress-strain), (4) hardness (or nanoindentation), (5) elongation at break, and (6) tensile strength. In particular, with the incorporation of 5-10% GONPs, the Young's modulus and hardness of the PU can significantly increase, e.g., by about 500-900% and about 300-400%, respectively.

Cai et al also revealed significant findings related to how PU is a polymer well known for its two-phase microstructure containing alternative soft and hard segments. Others have also revealed that the PU hard segment, with glassy or a lamellar crystalline structure, acts as physical crosslinkers for the rubbery soft segment in PU (Koberstein et al 1992). Phase separation resulting from the thermodynamic incompatibility between the soft and hard segment plays a key role in their versatile physical properties. Both thermal analysis and infrared spectra can be used to investigate the effect of the GONPs on the phase separation.

Modulated differential scanning calorimetry (MDSC) analysis can also be conducted to investigate the effect of the GONPs on the hard segment. The MDSC heat flow curves may indicate that a melting-like transition temperature relating to the hard segment of the PU appears around 2000 deg. Celsius. As the incorporation of GONPs increase, the melting-like transition may completely disappear and be replaced by at least one re-crystallization transition. Cai et al reported that this finding indicated that a sufficient amount of the GONPs (e.g.—up to 4.4 wt %) can actually result in damage to the crystalline structure of the hard segment. This was suggested by Cai et al. to potentially be related to the fact that the two-dimensional structure of large graphene sheets (i.e.—presumably in flake form) prevents the formation of the lamellar structure in the hard segment.

In the compositions described herein, alterations or damage to the hard segment crystalline structure—along with cross-linked replacement with interconnected graphitic sheets—may potentially aid in improved transport of charge carrier electrons throughout a graphene-loaded PU foam composition.

Dynamic mechanical analysis (DMA) can be further used (via dynamic thermal analyzer instrument) to investigate the interaction between the GONPs and the soft segment. The applicable test results may show that the storage modulus of the PU composite can increase significantly, e.g., 30-50%, as compared to PU. For example, other have shown that there was an absence of any shift in the transition peak of damping factor associated with the glass transition temperature (Tg) of the soft segment, which demonstrates the interaction between the GONPs and the soft segment is very weak. At the same time, a decrease in damping capacity was associated with a greatly restricted motion of PU chains as related to the crosslinking function of the GONPs for isocyanate-terminated PU chains. With the incorporation of 4.4 wt % GONPs, the elastic modulus increased about 182%, thus indicating a similar relationship with the varying trend of the Young's modulus.

Cooper et al devised a method to estimate applicable phase separation in a candidate GONP/PU composite using FTIR analysis (Seymour et al 1970). The actual degree of phase separation (DPS) can be calculated on the fundamental basis of a hydrogen bonding index (i.e.—in an applicable equation). In summary, the FTIR spectra of the neat PU and 4.4 wt % GONP/PU composite (per area of applicable hydrogen bonded vs. free —C=O peaks) in Cooper et al. produced values for the overall DPS that were indicative of a condition wherein a reduction of the phase separation is caused by the incorporation of the GONPs. Cai et al noted that the GONPs perform two roles with respect to the morphology of the PU: (1) the chemical crosslinker for isocyanate-terminated PU; and (2) the destroyer of the crystalline hard segment. These two roles thus affect the mechanical properties of the PU in opposite ways.

The Cai et al mechanical properties characterization is consistent with the Young's modulus of the PU composite being nearly ten times higher than that of the pure PU. This result was suggested to have occurred directly in accordance with efficient load transfer between the GONPs and the PU matrix resulting from the aforementioned chemical bonding (Cai et al 2009).

Sadasivuni et al investigated the dynamic mechanical, dielectric, and rheological properties of reinforced polyurethane nanocomposites containing either unmodified (hydrophilic) graphene oxide (uGO), or modified (hydrophobic) graphene oxide (mGO) sheets. In particular, while directed toward a thermoplastic (soft segment elastomer), the respective research effort by Sadasivuni et al. highlighted important results applicable to dielectric measurements comparing different polyurethane nanocomposite filler concentrations for uGO and mGO additions. Due to its polar nature, uGO has only limited solubility in organic solvents and non-polar polymers—thus necessitating, as previously noted, surface treatments to improve the performance of such nanocomposites. As already noted, the organic modification of GO can be performed with 4,4'-methylenebis (phenyl isocyanate) (MDI) and the samples can be prepared by solvent mixing. Sadasivuni et al specified that addition of mGO can afford a more significant increase in the dielectric permittivity as compared to the addition of uGO. Scanning electron microscopy and X-ray diffraction spectroscopy performed by Sadasivuni et al further indicated that a more effective dispersion of exfoliated, thin sheets of mGO was accomplished in the polyurethane matrix as compared to uGO.

It was also reported that the quality of dispersion(s) of mGO in polyurethane is enhanced by introducing MDI to the mGO dispersion and polyurethane mixture as well. According to the Sadasivuni work, the isocyanate (NCO) groups at the end of the linear (reacted) polyurethane interacted with the oxygen groups on the GO—that is, as MDI applicable to the mGO dispersion treated the GO filler surfaces. And, as for the complete synthesis and dispersion of mGO, Sadasivuni et al also employed DMF as was previously utilized in, for instance, the Stankovich et al effort. Solution mixing can be employed in order to achieve a better dispersion of mGO in the polyurethane matrix, while the filler concentration was varied from 0 to 3.0 wt %. It was suggested by Sadasivuni et al hat the observed results underlined the possibilities of polyurethane composites with organically-modified GO sheets proving viable in capacitor applications.

When placed in an electric field, Sadasivuni et al specified that nanocomposites undergo ionic, interfacial, and dipole polarization over different time and length scales. This effective dielectric constant was defined (i.e.—in equation form) by: (1) the effective dielectric constant, $E_r$, (2) the dielectric constant of the polymer matrix, $\varepsilon_m$, (3) the percolation threshold, $f_c$, (4) the volume fraction of metal or inorganic filler, f, and (5) a scaling constant, s (~1). Low $\varepsilon r/\varepsilon m$ values can be attributed to a poor dispersion of the filler in the composites and weak filler-polymer interactions, thus correlating dielectric spectroscopy with the microstructure of the composite.

The dielectric constant ε' and dielectric loss ε" results for produced polyurethane nanocomposites—over a frequency range of 10-2 to 106 Hz at room temperature—can also be measured. In some examples, the dielectric constant (i.e.—absolute values) can significantly increase over the entire frequency range by the addition of uGO/mGO nanosheets due to the high filler surface area. In the Sadasivuni et al reference, with the incorporation of uGO/mGO, the dielectric constant for filled polyurethane films measured at different frequencies increased significantly from PuGO-0.5, PuGO-1.5, PuGO-3, PmGO-0.5, PmGO-1.5, and PmGO-3 films, respectively. According to the Sadasivuni et al work, the suggested abrupt increase in the dielectric permittivity of the nanocomposites was tied to the motion of free charge carriers associated with the formation of a continuous conductive pathway of uGO/mGO nanosheets throughout the nanocomposite medium. It was further noted by Sadasivuni et al that an increase in dielectric constant in conductive polymer nanocomposites is usually accompanied by an increase in dielectric loss and a decrease in the dielectric strength, thus limiting their functionality in terms of desirable energy storage capabilities. But, for the polymer nanocomposites as tested by Sadasivuni et al, the PmGO-3 dispersions proved to be capable of producing stable nanocomposite films of high dielectric constant and low dielectric loss (Sadasivuni et al 2014).

In certain examples described herein, geotechnical-class products in which plural-component ECPG nanocomposite foams are used may provide desirable attributes including one or more of (1) providing geotechnical SPF formations that include a direct current electrical conductivity which is absent conventional geotechnical SPF foam compounds; (2) providing electrically-conductive geotechnical SPF formations that include a certain density and a compressive strength capable of physically supporting varying sizes of pipeline structures, e.g., on the order of 36.0"-42.0"—when subjected to significant mechanical loads as may be applicable to underground oil & gas transmission pipelines; (3) providing electrically-conductive geotechnical SPF formations that include a certain level of yield behavior of energy capable of minimizing external coating damage and/or ovality and denting on varying sizes of pipeline structures, e.g., on the order of 36.0"-42.0"—when subjected to significant mechanical loads as may be applicable to underground oil & gas transmission pipelines; and (4) providing electrically-conductive geotechnical SPF formations that may include a primarily open-cell foam which is less susceptible to flotation (i.e.—via water absorption) when installed as either a supportive pad or a trench breaker in a pipeline trench, wherein heavy rain conditions may fill the open pipe trench with water.

In certain configurations, a method of manufacturing ECPG nanocomposite foams is described. To partly accomplish these nanocomposite systems, dispersions of isocyanate-treated, reduced GONPs are homogenously dispersed within what is customarily referred to as 'Part B' of a particular rigid (i.e.—thermoset) foam composition. And, upon reaction via spray application of said 'Part B' (itself a liquid polyol) with a customary isocyanate-rich 'Part A' liquid, a representative ECPG is therein formed. More particularly, short of actual spray application, these ECPG nanocomposite foams are produced, in part, via 'Part B' solution phase processing in which a chemical reduction (or chemical deoxygenation) of the isocyanate-treated GONPs is achieved in-situ with an organic solvent in the presence of a reducing agent and the host polyol liquid.

To this end, production of ECPG nanocomposite foams can comprise, in part, electroconductive dispersions of exfoliated, isocyanate-treated GONPs dispersed in an organic liquid dispersing medium, wherein the GONPs have further been reduced in the presence of a reducing agent in-situ to the polyol(s) of said Part B.

Advancements in the modification of graphene and the fabrication of graphene-based polymer nanocomposites have revealed that the graphene nanostructure can be advantageously employed as a two-dimensional filler for thermoset polyurethane resins since it supports dispersion pathways in polymers of a variety of functional characteristics which are not accessible by using other types of fillers.

The dispersions of GONPs are formed by exfoliating GONPs from bulk GO in an organic liquid dispersing medium using ultrasonic energy.

For purposes of illustration and not limitation, the bulk GO may comprise using commercially-available bulk graphite that, as acquired, has been subjected to an oxidative treatment to at least include reaction with, for instance, potassium permanganate ($KMnO_4$) in concentrated sulfuric acid. More specifically, GO applicable to the inventive ECPG nanocomposite foams may be prepared by a method known as Hummers method. For example, Hummers method typically provides graphite oxide through the addition of potassium permanganate to a solution of graphite, sodium nitrate, and sulfuric acid.

Subsequent proper drying, a predetermined amount of graphite oxide (e.g.—50 mg) is suspended in anhydrous DMF, treated with phenyl isocyanate (e.g.—2 mmol) for a specific period of time (e.g.—24 hours), and physically recovered through a proper means of filtration as applicable.

Alternative methods of improved synthesis of GO versus the Hummers method are also applicable to the inventive concept presented hereto. For instance, it has been noted through applicable research that excluding the $NaNO_3$, increasing the amount of $KMnO_4$, and performing the reaction in a 9:1 mixture of $H_2SO_4/H_3PO_4$ improves the efficiency of the oxidation process. This improved method generally not only provides a greater amount of hydrophilic oxidized graphene material as compared to Hummers method, but it further is accomplished in absence of any toxic gases.

The bulk GO, as applicably prepared, can be treated with an organic isocyanate prior to exfoliation such that the resulting isocyanate-treated GO can be exfoliated in an organic liquid dispersing medium to provide a stable dispersion of functionalized graphene oxide nanoplatelets.

The organic liquid dispersing medium may comprise at least one polar aprotic solvent or liquid selected from the group consisting of dimethylformamide (DMF), N-methylpyrrolidone (NMP), dimethyl sulfoxide (DMSO), and hexamethylphosphoramide (HMPA).

Such treatment or "functionalization" of graphite oxide with organic isocyanates can lead to the derivatization of both the edge carboxyl and surface hydroxyl functional groups via formation of amides or carbamate esters, respectively. In particular, the formation of carbamate esters upon treatment of GO with isocyanates removes the ability of the edge carboxyl and surface hydroxyl groups to engage in hydrogen bonding, thus rendering GO sheets less hydrophilic and hence more compatible with polar aprotic solvents than with water.

Stable dispersions of the resulting ITGO materials [may thus be] prepared via room temperature ultrasonic exfoliation in DMF (e.g.—1 mg/mL) as applicable to achieving an homogenous slurry reaction mixture (e.g.—1 hr. at frequency of 20 kHz).

Without wishing to be bound by any particular theory, The extent of functionalization with different isocyanates may correlate with their relative reactivities. The applicable chemistry has in fact been suggested as quite general for a variety of isocyanates, including those containing reactive functionalities. As such, isocyanate treatment can be used to engender a plethora of functional groups on GONPs—not only for tailoring surface properties, but also for further chemical modifications. In this case, ITGOs that have been functionalized with, for instance, carbonyl, cyano, and azidosulfonyl groups can be used for the covalent linking of GONPs to a variety of materials containing complementary reactive functional groups to afford new nano structures.

The isocyanate-based processing methods described herein—through graphitic material exfoliation in DMF—further supports facilitated realization of chemically derivatized GONPs that subsequently require an in-situ chemical reduction treatment in the same organic solvent medium, such as applicable to imparting electrical conductivity in the dispersed graphitic materials.

The dispersions of ITGO nanoplatelets may be prepared in accordance with a master batch process wherein solution phase processing (e.g.—at 800 C) may further be accomplished toward directly adding controlled amounts (e.g.—wt %) of ITGO nanoplatelets (e.g.—3 g/12 oz) in a prepared polyol resin (e.g.—1 gal.) for additional treatment as applicable.

As an alternative to, for instance, polyethers derived from ethylene and propylene oxides, certain vegetable oils (or vegetable polyols) may be utilized for the preparation of segmented polyurethane in accordance with inventive concept presented herein.

Solution phase processing (e.g.—at 800 C) via inclusion of an organic solvent, such as DMF, in polyol is anticipated to impart a positive effect on overall polyol viscosity wherein the dispersion of added ITGOs is directly facilitated.

Once added to a given volume of polyol resin, each master batch—whether in part, or in whole—can be subjected (at least initially) to ultrasonic mixing treatment (e.g.—Hielscher UIP1000hdT at 1000 W, 20 kHz with flow cell reactor) in appropriate temperature-controlled process apparatus as applicable to achieving an initial homogenous dispersion of GONPS in said polyol resin. The master batch may subsequently be subjected to mechanical mixing means involving, for instance, high-shear mechanical mixing as suitable for viscous media.

Solution phase processing in accordance with either one or both of such ultrasonic and mechanical mixing techniques can thus be utilized to enable a preferred, calculated amount (e.g.—wt. %) of isocyanate-treated, reduced GONPs to be substantially homogeneously dispersed throughout the entire volume of prepared polyol.

In addition, solution phase processing to this end can further be optimized in accordance with all relevant, and correlative, process parameters such as: (1) temperature, (2) pressure, (3) amplitude, (4) sonication time, (5) mixing speed, and (6) liquid composition.

The compositions described herein are not limited to making a dispersion of functionalized GONPs using the above exfoliation method and can be practiced using other dispersion-forming techniques such as prolonged stirring or other exfoliation techniques.

Once added to the polyol resin, the isocyanate-treated dispersion of GONPs applicable to an individual master batch is subjected to a chemical reduction treatment in the presence of a reducing agent (and DMF) to remove at least some of the oxygen functionalities from the dispersed GONP materials. A certain amount of oxygen is nevertheless retained after the reduction, thereby resulting in the reduced material consisting of partially-oxidized graphitic nanoplatelets.

The chemical reduction treatment can thus result in an increase in the C/O atomic ratio applicable to reduced GO material versus that of starting GO material.

The reducing agent can comprise N,N-dimethylhydrazine as related to processing in accordance with organic solvent media (e.g.—0.1 ml in 10 ml of DMF at 80° C. for 24 hours).

Partial restoration of the aromatic graphene network, and even single graphite sheets (i.e.—finite-sized graphene sheets), can be provided via the GO exfoliation followed by the subsequent solution-based chemical reduction treatment.

In practice, ECPG nanocomposite foams produced as described herein can comprise individual graphene sheets well dispersed, e.g., substantially homogeneously, throughout the thermoset polymer matrix.

Other suitable reducing agents effective to achieve deoxygenation of the GONPS may also be employed in accordance with the solution phase processing techniques described herein. For instance, chemical reduction of applicable dispersed nanoplatelets may also be accomplished with vitamin C which, on an empirical evaluation basis, has exhibited real promise for replacing hydrazine in the reduction of GO dispersions by an innocuous and safe reductant of similar efficacy. Stable dispersions of vitamin C-reduced GO can be prepared not only in water, but also in common organic solvents, such as DMF or N-methyl-2-pyrrolidone (NMP).

The resultant mixture of the master batch of GONPs dispersed in the prepared polyol (via DMF) may further be subjected to either a singular, or combined application of: (1) thermal treatment and/or (2) vacuum processing to remove an applicable (or preferred) amount of any excess (or residual) solvent as applicable.

In preparation of certain ECPG composite formulations, chemical reduction is essential for inducing electrical conductivity, as composites with un-reduced phenyl isocyanate-treated GO sheets have proven insulating.

Application of the reduction treatment to the dispersed GONPs in-situ of the prepared polyol 'Part B' can be used to prevent agglomeration of the individual sheets. In particular, as the reduction proceeds, the sheets may become coated with the polymer and remain individually dispersed.

The dispersions of GONPs reduced in-situ (in DMF) of the prepared polyol 'Part B' may contain bulk exfoliated GONPs manufactured in various grades and sizes with thickness ranging from 1 to 20 nanometers and width ranging from 1 to 50 microns. For purposes of illustration and not limitation, bulk GO can be prepared using, for instance, SP-1 bulk graphite from Bay Carbon (Bay City, Mich.) or carbonaceous materials commercially available from other sources.

Exfoliated GONPs realized on the basis of an oxidative treatment process such as Hummers method may provide a graphitic surface of, for instance, sp2 carbon molecules that renders such nanoplatelets especially suitable for applications requiring high electrical and/or thermal conductivity.

The electroconductive dispersions of GONPs reduced in-situ of the prepared polyol 'Part B' may comprise an exfoliated graphene nanoplatelet. For instance, SP-1 Graphite Powder (Bay Carbon, Inc.), xGnP Graphene Nanoplatelets (XG Sciences, Inc.), and Strem 06-0210, 06-0215 and 06-0220 Graphene Nanoplatelets (Strem Chemicals, Inc.) may be used as the exfoliated graphene nanoplatelet.

In some instances, a thermoset polyurethane is an appropriate polymer in the synthesis of ECPG nanocomposite foams wherein it forms chemical bonds with GONPs via reaction between isocyanate groups at the end of PU chains and oxygenated groups on the GONPs. As reacted with dispersions of GO (in DMF) for a specific period of time, an organic isocyanate compound attaches to the hydroxyl and carboxyl groups of GO via the formation of carbamate and amide functionalities, respectively. Through the creation of such chemical functionality, there is a strong interaction between the GONPs and the hard segment of the PU, thus allowing for substantially complete load transfer.

In this case, isocyanate-modified graphene consistent with the chemical functionalization means (or bonding aspects) presented herein can further support viable filler load transfer as fundamentally applicable to high-pressure spray application in which graphene-filled polyol 'Part B' is combined with an isocyanate-rich 'Part A' component.

Advancements in the modification of graphene and fabrication of polymer nanocomposites have resulted in a graphene-filled polystyrene composite that exhibited a percolation threshold three times lower than that reported for any other two-dimensional fillers. It has also been revealed that this level of performance is attributed to the homogeneous dispersion characteristics and extremely large aspect ratio associated with graphene. It's in this particular context that a rapid increase in the direct current electrical conductivity of composite materials takes place when the conductive filler forms an infinite network of connected paths through the insulating matrix. When the filler particles are rigid bodies, the conductivity of such media is typically described with a bond percolation model. The conductivity of the composite, $\sigma_c$—above the percolation threshold is then treated with power law:

$$\sigma_c = \sigma_f[(\Phi - \Phi_c)/(1 - \Phi_c)]$$

where $\sigma_f$ is the conductivity of the filler, $\Phi$ is the filler volume fraction, $\Phi_c$ is the percolation threshold (the onset of the transition), and t is the 'universal critical exponent'. The power law is described in Journal of Polymer Science, Volume 43, 2005, pp. 3273-3287.

In some embodiments, prepared volumes of polyol resin 'Part B' incorporating an individual master batch of isocyanate-functionalized, reduced nanoplatelets can, when reacted with isocyanate 'Part A', can achieve a rapid increase in the direct current electrical conductivity at very low filler loading.

Certain configurations of the composition permit manufacturing plural-component SPF material systems comprised of an isocyanate-rich 'Part A' and a polyol-rich, graphene-filled 'Part B' wherein high-pressure spray application (i.e.—combination) of the two parts results in an exothermic reaction which thereby foams and thus physically cures the polyurethane foam.

Synthesis of thermoset ECPG nanocomposite foams consistent with the invention thus comprises high-pressure spray application in which, as curing is initiated by spray combination of Parts A and B, a chemical bonding process occurs with incorporated GONPs via reaction between polyurethane chain-end isocyanate groups and oxygenated groups on the carbon nanomaterials.

Embodiments described herein also permit manufacturing plural-component SPF material systems in which, upon curing due to high-pressure spray application, the synthesis of three-dimensional ECPG composite foams comprises such in-situ chemical functionality wherein strong interaction between functionalized GONPs and polyurethane hard segments enables a complete load transfer.

Synthesis of thermoset ECPG composite foams can provide levels of direct current electrical conductivity attributable to formation of a conducting, interconnected graphene-based sheet network propagated throughout the entire polymer matrix.

Production of ECPG composite systems can provide levels of direct current electrical conductivity as materially consistent with non-shielding CP systems functionality applicable to achieving viable corrosion mitigation in underground oil and gas pipeline infrastructure.

In certain embodiments, preparation of polyurethane foams may comprise processes in which two components or three components may be used. Generally, Part A may comprise an isocyanate. Part A may also comprise a surfactant, blowing agent, and/or flame retardant. Part B may comprise any of various polyols, particularly polyether and/or polyester polyols. Part B may also comprise a surfactant, a catalyst package, a blowing agent or agents, flame retardants, antioxidants, fungicides, viscosity modifiers, acid scavengers, solid fillers and many other additives, any or all of which may reside solely in Part B. Alternatively, any or all of such Part B ingredients may be introduced to the reaction mixture in a third stream or in both Part B and a third stream. Processes for making foams may involve mixing of the starting materials with applicable polyurethane foam production equipment and pouring the reacting mixture, as it exits the mix-head, into a mold or other designation. For use in trenches applicable to installation of pipelines, the polyurethane foam may be applied directly in the trench in the field, or made into prefabricated pads, pillows, and/or saddles, and the like, prior to installation.

In certain configurations, a method of manufacturing a rigid, closed-cell polyurethane foam which can comprise direct current electrical conductivity comprises preparing (i.e.—per U.S. designation) at least one isocyanate (hereinafter 'Part A') and at least one isocyanate-reactive component (hereinafter 'Part B') and intimately, in the presence of a dispersion of isocyanate-treated GONPs reduced in-situ (in DMF) with the at least one polyol of Part B, mixing all applicable reaction components to foam and thus polymerize such an ECPG composite foam.

The Part A compound and Part B compound may further be prepared in the presence of, for instance, at least one catalyst, other additives including at least one surfactant, and at least one blowing agent.

The Part A compound having at least one isocyanate component may be selected from any of the isocyanates, organic or inorganic, conventionally used in the production of polyurethane foams including those illustrative materials described herein, for example.

In one illustrative embodiment, the Part A compound having at least one isocyanate may comprise any of the polyfunctional isocyanates, such as isophorone diisocyanate, polymeric methylenebis (phenyl isocyanate), 2,6-toluene diisocyanate, 4,4'-methylenebis(phenyl isocyanate), dianisidine diisocyanate, tolidine diisocyanate, hexamethylene diisocyanate, m-xylene diisocyanate, 1,5-napthalene diisocyanate, p-phenylene diisocyanate 1,5-napthalene diisocyanate, p-phenylene diisocyanate, 1,4-di-ethylbenzene diisocyanate, polymethylenepolyphenylisocyane, 3,3-diphenyldimethylmethane-4,4-diisocyanate, xylylene diisocyanates, xylyl diisocyanates, 2,4-toluenediisocyanate dimer, m-phenylenediisocyante, toluene diisocynates, diphenylmethane-2,4-diisocyanate, etc., and mixtures thereof.

The Part A having at least one isocyanate may also comprise, for instance, a surfactant, a blowing agent, and a flame retardant.

In any formulation of Part A prepared in the presence of other additives including at least one surfactant, the surfactant may include silicones, such as B-8407, DC-5098, DC-198, Silstab 2800, L-5340 and B-8021, other silicones, and siloxaneoxyalkylene block copolymers. The surfactant can make up less than about 4% by weight, preferably about 0.75% by weight, of component A. Typically, the balance of component A is the isocyanate.

In any formulation of Part A in which a blowing agent is utilized, although such an agent in Part A is optional, the blowing agent may be selected from the group consisting of, for instance, chlorofluorocarbons (CFC's), hydrochlorofluorocarbons (HCFC's), hydrofluorocarbons (HFC's), hydrofluoro ethers (HFE's), hydrofluoro olefins (HFO's), methylene chloride, hydrocarbons, and alkyl alkanoates, or other organic compounds can also be used.

In any formulation of Part A in which a blowing agent is utilized, although such an agent in Part A is optional, the blowing agent may further be selected from any group consisting of, for instance, CFC-free and/or other zero-ozone-depleting blowing agent(s).

The materials of Part A can be blended in any standard manner. Nevertheless, a convenient order of mixing is to add surfactant to isocyanate and then to add the blowing agent(s), if any. While the exact order of addition is not critical, the addition of surfactant first may assist in dispersing the various materials in the dispersion.

Any added flame retardants of Part A may comprise, for instance, those containing bromine, chlorine, or phosphorus. In addition, other flame retardant additives that are traditionally employed in spray polyurethane foam compositions may also be appropriate for use in the ECPG nanocomposite foams of the current invention.

The Part B compound having at least one isocyanate-reactive component may comprise at least one polyol selected from the groups consisting of polyalkoxylated amines, polyalkoxylated ethers, and polyester polyols, and combinations thereof. In practice, the Part B compound containing at least one polyol typically consists of 50% polyol(s) (by weight) to about 98% (by weight), preferably 60% (by weight) to about 92% (by weight) of at least one polyol. Preferably, the hydroxyl number is from about 20 to about 750, most preferably about 300 to about 500 for rigid foams and most preferably 20-100 flexible foams. However, the selected hydroxyl ranges are determined solely by the desired end product. In an illustrative embodiment, the polyalkoxylated polyols of Part B may be polyethoxylated, polypropoxylated, or polybutoxylated, or mixtures thereof. The polyalkoxylated amine can be, for instance, a polyalkoxylated aliphatic amine or a Mannich polyol; the polyalkoxylated ether can be, for instance, a polyalkoxylated sucrose or glycerin; and the polyester polyol can be a transesterification of a terephthalate or castor oil. The polyols can be made individually or as co-initiators.

One or more of any one of the three classes of polyols, e.g., the Part B compound having at least one isocyanate-reactive component may comprise at least one polyol selected from the groups consisting of polyalkoxylated amines, polyalkoxylated ethers, and polyester polyols, and combinations thereof, or any combination of polyols from any two or all three of the classes, can be used in Part B. Part B can contain other polyols as well.

Polyamine compounds that can be reacted with alkylene oxide to prepare amine-based polyols include mono-, di-, and triethanol amine, ethylene diamine, diethylene diamine, toluene diamine, etc. These polyhydric alcohols and polyamine compounds can be reacted separately with alkylene oxides, or they can be pre-mixed in the preparation of polyether polyol mixtures or blends. Illustrative polyester polyols may include those based on terephthalic, phthalic, isophthalic, adipic, succinic, glutaric, fumaric acid(s), and combinations thereof.

In practice, the polyols in the combination need not form a separate composition package to be added as a single ingredient to form Part B. The ingredients of Part B can be mixed in any order, and the polyols can be added separately from each other as separate ingredients to form Part B.

In an illustrative embodiment, Part B may also comprise one or more of a catalyst, a surfactant, a blowing agent or agents, flame retardants, antioxidants, fungicides, viscosity modifiers, acid scavengers, solid fillers, sacrificial UV absorbing agents to prevent UV oxidation of the foam materials, and many other additives, any or all of which may reside solely in Part B. Alternatively, any or all of such ingredients may be introduced to the reaction mixture in a third stream, or in both Part B and a third stream.

The catalyst can be any of the amine catalysts conventionally used in the production of polyurethane foams. The catalyst may be selected from classes of amine catalysts consisting of, for instance, N,N-dialklypiperazines; trialkylamines; N,N',N"-trialkylaminoalkyl-hexahydrotriazines; mono-, di-, and tri-(dialkylaminoalkyl) monohydric phenols or thiophenols; N,N,N'N'-tetraalkylalkylenediamines; N,N-dialkylcyclohexylamines; N-alkylmorpholines; N,N-dialkylalkanolamines; and N,N,N',N'-tetraalkylguanidines. In addition to the amine catalysts, any organometallic compound known to be a catalyst in the reaction between an isocyanate group and an active hydrogen-containing group can be used as a catalyst. Such catalysts include, but are not limited to, the organic acid salts of, and the organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium.

Other catalysts that may additionally catalyze either blowing or curing, or both blowing and curing, may also be added to Part B.

In any formulation of Part B prepared in the presence of other additives including at least one surfactant, the surfactant may include, for instance, at least one organic surfactant, at least one silicone-based surfactant, or combinations thereof, and any other additives that may additionally either stabilize a particular foaming reaction mixture until it cures, or that may be useful in facilitating any practice of utilizing the present invention.

The blowing agent may be selected from the group consisting of, for instance, CFC's, HFC's, HCFC's, HFE's, HFO's, aldols, hydrocarbons, alkyl alkanoates, as well as any others known to those skilled in the art of formulating polyurethane foam compositions. If an alkyl alkanoate is present, preferably, methyl formate is used.

Other useful polyhydric compounds that may be incorporated in Part B, whether or not an alkyl alkanoate is used as a blowing agent, and in addition to those listed above, include ethylene glycol, propylene glycol, diethylene glycol, dipropylene glycol, glycerol, pentaerythritol, sorbitol, sucrose, methyl glucoside, glucose, etc.

The blowing agent, in addition to those listed above, may include water, wherein included water can not only serve as a blowing agent, but add rigidity to the resulting foam as well. The exact percentage of water in the blowing agent may vary as desired.

The alkyl alkanoate, as well as other blowing agents, can be introduced by a separate stream in addition or in place of that which can be in either or both of parts A and B.

With regard to those compositions in which a blowing agent can hydrolyze or otherwise deteriorate, such that a catalyst in the mixture is attacked with consequent reduction in catalytic activity, an acid may be added to the mix to protect the susceptible catalyst. Any organic acid or inorganic acid that protects the amine catalyst from acids generated by the hydrolysis of a blowing agent, or other ingredients of Part B, can be used. Protection consists of maintaining a constancy of the reaction rate that permits the continued manufacture of the final product without a detrimental change in the performance. Any acid that functions to protect the amine catalyst from acid attack is suitable for use. In some instances, the acid is an organic acid. An example of a suitable organic acid is formic acid. The acid is present in a sufficient amount to maintain the activity of any amine catalysts.

In certain configurations, a method of manufacturing ECPG nanocomposite foams comprises preparing and containerizing Parts A and B. First, the Part A compound may include at least one isocyanate component and any one of a surfactant, blowing agent, and flame retardant. Second, the Part B compound may contain at least one isocyanate-reactive component, an electroconductive dispersion of isocyanate-functionalized GONPs reduced in-situ with a polyol, at least one catalyst, other additives including at least one surfactant, and at least one blowing agent. Together, the Part A and Part B compounds may thus be optimized for combined primarily chemically- and partially water-blown spray applications as applicable to producing physically-supportive "pads" and/or intermittent "trench-breaker" formations customary to, for instance, underground oil & gas pipeline facilities installation.

In other configurations, a method of manufacturing ECPG nanocomposite foams comprises mixing first the Part A compound including at least one isocyanate component and any one of a surfactant, blowing agent, and flame retardant, and, second, the Part B compound containing at least one isocyanate-reactive component, an electroconductive dispersion of isocyanate-functionalized GONPs reduced in-situ with a polyol, at least one catalyst, other additives including at least one surfactant, and at least one blowing agent, and reacting a mixture of Parts A and B to form at least one three-dimensional polyurethane foam formation or structure wherein at least 90% of the foam is closed cell.

In some examples, electrically-conductive geotechnical spray polyurethane foam "pad" and/or "trench-breaker" formations or structures can be produced by a method comprising preparing ECPG nanocomposite foams by mixing first the Part A compound including at least one isocyanate component and any one of a surfactant, blowing agent, and flame retardant, and, second, the Part B compound containing at least one isocyanate-reactive component, an electroconductive dispersion of isocyanate-functionalized GONPs reduced in-situ with a polyol, at least one catalyst, other additives including at least one surfactant, and at least one blowing agent, and by foaming a mixture of Parts A and B via combined primarily chemically- and partially water-blown spray application to provide closed-cell "pad" and/or "trench-breaker" formations.

In other examples, electrically-conductive geotechnical polyurethane foam formations or structures can be produced by a method comprising mixing first the Part A compound including at least one isocyanate component and any one of a surfactant, blowing agent, and flame retardant, and, second, the Part B compound containing at least one isocyanate-reactive component, an electroconductive dispersion of isocyanate-functionalized GONPs reduced in-situ with a polyol, at least one catalyst, other additives including at least one surfactant, and at least one blowing agent, and by spraying a mixture of Parts A and B to form at least one rigid, closed-cell polymer formation to be utilized in, for instance, underground oil & gas pipeline facilities installation.

In another example, ECPG nanocomposite foams can be provided according to the methods described above, wherein the at least one isocyanate-reactive component, an electroconductive dispersion of isocyanate-functionalized GONPs reduced in-situ with a polyol, at least one catalyst, and other additives including at least one surfactant may be combined in one stream; the at least one blowing agent and the water, if any, may represent a second stream; and the at least one isocyanate component may be a third stream. These three streams may then be simultaneously combined in accordance with, for instance, physical operation of plural-component, impingement-mix air spray gun equipment, and mixer configurations (if so required), as applicable to combined primarily chemically- and partially water-blown spray application of rigid, closed-cell polyurethane foam compositions.

In some instances, ECPG nanocomposite foams can be prepared by mixing first a Part A compound having at least one isocyanate component, and, second, a Part B compound having at least one isocyanate-reactive component, wherein said Part B further comprises an electroconductive dispersion of isocyanate-functionalized GONPs reduced in-situ with a polyol. The Part A compound and the Part B compound containing an electroconductive dispersion of isocyanate-functionalized GONPs reduced in-situ with a polyol may be further prepared in the presence of at least one catalyst, other additives including at least one surfactant, and at least one blowing agent, and by reacting a mixture of Parts A and B to form a rigid, yet primarily open-cell polymer.

In other embodiments, ECPG nanocomposite foams can be provided generally according to the methods described above, wherein the manufactured conductive polyurethane foams may have at least 50% open-cell content as directly applicable to provide a preferred density, compressive strength, and buoyancy of the manufactured conductive foam.

In other configurations, a flotation-resistant foam can be provided. For example, the flotation-resistant foam can be directed toward electrically-conductive polyurethane "pads" and/or "trench-breaker" formations or structures with sufficient strength and density to not only provide stability in the structural support of underground pipeline installations, but also negate any disturbance of installed pipes related to inordinate movement as may be associated with buoyant foams that may rise to an extent capable of cracking the pipeline installation.

In certain examples, the manufacture of ECPG nanocomposite foams may also involve foams prepared with less susceptibility to flotation, wherein at least 50% of the foam is open cell, the foam has a density of approximately 1.30 lbs./ft3 to 3.50 lbs./ft3, the foam has a minimum compressive strength of 17 psi parallel to the rise of the foam, and the foam, when tested in accordance with ASTM D2842, exhibits a buoyancy loss of at least 20% after twenty-four hours of testing under ten feet of water.

In some examples, any formulation of Parts A and B may include at least 50% open-cell content, Part A may generally contain an isocyanate, or mixtures and combinations of discrete isocyanates, and also a surfactant.

In some instances, at least one of the polyol(s) incorporated in Part B, whether a polyalkoxylated amine, a polyalkoxylated ether, or a polyester polyol, may have a hydroxyl number of from about 20 to about 1000. For example, the hydroxyl number is from about 20 to about 750, most preferably about 300 to about 500 for rigid foams, and most preferably 20-100 for flexible foams.

In certain configurations, certain hydroxyl ranges and other certain formulation characteristics of Part B may provide, or assist in providing, a desirable material density and a compressive strength in which the resultant foam may be absent such characteristics as those that may precipitate coating damage, pipe denting, and/or pipe ovality, all as may be associated with primarily closed-cell foams. As well understood to those experienced in the art of producing polyurethane foams, the appropriate hydroxyl number, as well as the types and quantities of any of the constituents in the formula, can be readily adjusted such that the desired properties of the finished foam are achieved.

In some examples, with respect to the interrelated mechanical and/or structural aspects of the Part B component, certain hydroxyl ranges and other certain formulation characteristics are provided wherein a total systems approach is pursued toward particular foam characteristics such as: (1) material density, (2) compressive strength, (3) storage modulus, (4) damping factor, and (5) Young's modulus—all as mechanically and/or physically applicable to constituent materials optimization for large-diameter pipelines on the order of from 36.0 in. diameter up to 42.0 in. and larger.

In some examples, Part B may comprise a surfactant that promotes cell opening of the foam and results in a foam that is at least 50% open cell. Examples of cell opening surfactants that may be associated with Part B include silicones, siloxane copolymers or non-siloxane copolymers, and non-silicones. Inclusion of any one such surfactant in Part B may thus affect the cell structure and other certain characteristics of the resultant foam as may be applicable to achieving an open-cell foam with less susceptibility to flotation.

In addition, Part B may further comprise a surfactant that promotes cell closing. Examples of cell closing surfactants include silicones and/or non-silicones, and siloxane copolymers.

In some embodiments, the concentration of cell opening surfactant in Part B may range from roughly 0.10% to about 4.0% by weight, preferably about 0.10% to about 1.0% by weight, and more preferably about 0.20% to about 0.70% by weight. If a cell closing surfactant is present, it typically accounts for approximately 0.10% to about 4.0% by weight, or preferably about 0.50% to about 3.0% by weight, of Part B. Once again, one skilled in the art of producing geotechnical polyurethane foam compositions, given the benefit of this description, can adjust the concentrations of the cell opening and cell closing surfactants in order to accomplish the desired density, compressive strength, and buoyancy of the resultant foam.

In some examples, Part B can also comprise other ingredients as desired. Optional additives, such as dispersing agents, cell stabilizers, flame retardants, and the like, that are commonly used in the fabrication of polymer foams can be used in the process of the invention. For example, a fire retardant, such as those containing bromine, chlorine or phosphorus, can be incorporated into the mixture to impart fire resistance.

Other optional additives, such as inorganic and organic fillers, can also be used. Examples of inorganic fillers include calcium carbonate, barium sulfate, silica, glass, antimony oxides, etc. Examples of organic fillers include the various polymers and copolymers of vinyl chloride, vinyl acetate, acrylonitrile, styrene, melamine, partially oxyalkylated melamine, etc. Organic esters can also be used. Particularly-preferred Certain esters are those derived from dicarboxylic acids, such as oxalic, malonic, succinic, glutaric, maleic, phthalic, isophthalic, and terephthalic acids.

Other commonly used additives are hydroxyl-containing compositions, such as castor oil, aromatic polyesters, glycols and/or alkoxylated sorbitols, acid scavengers (for example, α-methyl styrene), acid formation inhibitors, or diluents.

In one embodiment, a one-shot method of foam fabrication is used, whereby the isocyanate containing stream (Part A) and the polyol-containing and catalyst-containing stream (Part B) are mixed. Each of these streams is preferably liquid in which all of the various additives are preferably soluble, although dispersions utilizing solid components can be used as desired. Part A and Part B can be mixed, such as through a static mix, high pressure mix, or impingement mix chamber, or any other device commonly known in the industry, by standard procedures to produce an homogenous blend.

Part A and Part B may be mixed in a relative proportion such that the ratio of the cyano groups of Part A to the hydroxyl groups of Part B, the NCO/OH ratio or index, is from about 0.8:1 to about 3:1.

In some examples, a method of manufacturing ECPG nanocomposite foams comprises mixing first the Part A compound including at least one isocyanate component and any one of a surfactant, blowing agent, and flame retardant, and, second, the Part B compound containing at least one isocyanate-reactive component, an electroconductive dispersion of isocyanate-functionalized GONPs reduced in-situ with a polyol, at least one catalyst, other additives including at least one surfactant, and at least one blowing agent, and reacting a mixture of Parts A and B to form at least one three-dimensional polyurethane foam formation wherein at least 50% of the foam is open cell.

In other examples, electrically-conductive geotechnical spray polyurethane foam "pad" and/or "trench-breaker" formations or structures can be provided that are produced by a method, including preparing ECPG nanocomposite foams by mixing first the Part A compound including at least one isocyanate component and any one of a surfactant, blowing agent, and flame retardant, and, second, the Part B compound containing at least one isocyanate-reactive component, an electroconductive dispersion of isocyanate-functionalized GONPs reduced in-situ with a polyol, at least one catalyst, other additives including at least one surfactant, and at least one blowing agent, and by foaming a mixture of Parts A and B via combined primarily chemically- and partially water-blown spray application to provide primarily open-cell "pad" and/or "trench-breaker" formations.

In certain examples, electrically-conductive geotechnical polyurethane foam formations or structures can be produced by a method including mixing first the Part A compound including at least one isocyanate component and any one of a surfactant, blowing agent, and flame retardant, and, second, the Part B compound containing at least one isocyanate-reactive component, an electroconductive dispersion of isocyanate-functionalized GONPs reduced in-situ with a polyol, at least one catalyst, other additives including at least one surfactant, and at least one blowing agent, and by spraying a mixture of Parts A and B to form at least one ECPG nanocomposite foams formation in which at least 50% of the foam is open cell as may be applicable to flotation-resistant use in, for instance, underground oil & gas pipeline facilities installation.

In other examples, ECPG nanocomposite foams can be provided according to the methods described herein, wherein the at least one isocyanate-reactive component, an electroconductive dispersion of isocyanate-functionalized GONPs reduced in-situ with a polyol, at least one catalyst, and other additives including at least one surfactant may be combined in one stream; the at least one blowing agent and the water, if any, may represent a second stream; and the at least one isocyanate component may be a third stream. These three streams may then be simultaneously combined in accordance with, for instance, customary operation of plural-component, impingement-mix air spray gun equipment, and mixer configurations (if so required), as applicable to combined primarily chemically- and partially water-blown spray application of strong, yet primarily open-cell polyurethane foam compositions.

In some embodiments and independent of surfactant chemistry and thus applicable closed- or open-cell content, the Part A compound having at least one isocyanate component and the Part B compound having at least one isocyanate-reactive component may, when mixed together, comprise a mixture with a low-exothermic reaction temperature to support a continuous lift of polyurethane foam in absence of undesirable charring or ignition.

In other instances, ECPG nanocomposite foams can be provided according to the methods described herein, wherein the at least one isocyanate-reactive component, at least one catalyst, other additives including at least one surfactant, and the at least one blowing agent and the water, if any, may be combined as one stream, and the at least one isocyanate component may be a second stream.

Other combined primarily chemically- and partially water-blown spray application protocols may also be selected as may be applicable to user preference and/or spray application equipment capabilities. For instance, a pre-heat process (up to roughly 1000 F) and/or a brief mixing process (as opposed to extended high-shear mixing) applicable to the Part B compound may be performed over a certain period without any degradation or loss of either electrically-conductive graphene sheet suspensions or blowing agent(s) performance.

In some examples, plural-component SPF material systems can be produced which comprise an isocyanate-rich 'Part A' and a polyol-rich, graphene-filled 'Part B' which are formulated in a manner consistent with optimal field-level synthesis of three-dimensional ECPG composite formations or structures.

In some embodiments, the compositions described herein may comprise "tuned" additions of electrically-conductive GONPs to more than just a certain would-be class of geotechnical-level polyurethane foam compounds applicable to oil & gas pipeline projects construction. For example, a selective, yet varying range of SPF compositions may comprise both closed-cell and open-cell ECPG nanocomposite systems. Moreover, specific material systems collectively applicable to the synthesis of different three-dimensional ECPG composite foams in terms of, for instance, density, compressive strength, storage modulus, damping factor, and Young's modulus are all possible. Physical and/or mechanical performance characteristics of a particular composite formulations can be uniquely optimized as relevant to, for instance, large-diameter hazardous material pipelines on the order of from 36.0 in. diameter up to 42.0 in. and larger In some embodiments, for polyols employed for the production of polyurethane, these polyols may be based on polyethers derived from ethylene and propylene oxides. At the same time, though, there is a wide range of vegetable oils that can be used for the preparation of segmented polyurethane including sunflower and safflower, but mainly castor and soybean oils. Raw materials based on vegetable oils are an important consideration whereas they have a number of excellent attributes for producing valuable polymers such as polyurethane. For example, castor, soybean, sunflower, cashew, coconut, Karanja, and amaranth have been used for synthesis of different kinds of polymeric materials. Extensive research on the synthesis of vegetable polyols and characterization of their corresponding polyurethane exists. Such vegetable polyols may provide economic benefits as well as environmental benefits In some examples, ECPG nanocomposite foams can be provided according to the methods described herein, wherein the manufactured foams—whether spray-applied or not may have a direct current electrical conductivity which is absent from conventional geotechnical polyurethane foam compositions.

In some examples, graphene or graphene-base materials can provide barrier protection properties at typical material loading levels. Novel polyurethane-graphene composites with enhanced gas barrier performance can provide a viable first line of defense in connection with hydraulic fracturing operations where failure (or rupture) of underground gathering lines can result in, for instance, inadvertent releases of methane gas into nearby underground water resources. Installed to collect and transport natural gas from associated wells and related production facilities to transmission pipelines, gathering lines associated with hydraulic fracturing operations have historically been smaller in diameter (i.e.— typically up to 12.0 inches) than transmission lines. These earlier gathering lines generally operated at relatively low gas transport pressures as well.

In accordance with the latest proliferation of hydraulic fracturing—or "fracking"—operations, the construction of modern-day gathering lines now involves pipes that are considerably larger and thus subject to higher pressures— thereby making such underground infrastructure virtually identical to transmission lines. The fracking technology that has triggered the boom in U.S. drilling operations has resulted in the use of gathering lines that are now 12.0 to 36.0 inches in diameter—that is, to accommodate the increased volume and pressure of natural gas now coming out of fracked wells.

The design, construction, operation, and maintenance of gathering, transmission, and distribution pipelines is collectively regulated by the Pipeline and Hazardous Materials Safety Administration (PHMSA), the federal agency established by the U.S. Department of Transportation to ensure best practices are followed per PHMSA safety regulations in 49 CFR 192. These safety regulations, however, are predicated upon PHMSA rulemakings (§ 192.1(b)(4)) that fail to apply to gathering lines in locations that are generally considered as "rural locations." These are areas designated as "Class 1" in which such locations are defined to have fewer than ten habitable dwellings per mile within (220) yards of a pipeline's centerline. And, in light of the aforementioned boom in U.S. fracking operations, there are now a multitude of Class 1 gathering lines that, as reported, have been buried in locations some consider as unreasonably close to various residential dwellings.

In some embodiments, the compositions described herein are directly applicable to, for instance, minimizing the negative impacts of potential methane gas leaks that can migrate into underground sources of drinking water (or USDWs). For example, material encasement of new gathering lines via high-gas-barrier polyurethane-graphene composites could fundamentally support new environmental protection standards such that modern-day fracking operations are collectively brought to bear more responsibly. Moreover, with such advanced material protections in place, the potential occurrence of gathering line mishaps should be reduced, which can reduce or prevent widespread environmental damage, or perhaps even loss of life.

Many advocates for improved Pipeline Integrity Management (PIM) measures, such as those increasingly involved in what are now individual State-backed PIM programs, are also pushing forward on establishing Best Management Practices (BMPs) that address implementation of cathodic protection programs not only on new underground transmission lines, but the many miles of gathering lines now coming into operation just the same. The use of the compositions described herein to this overall extent—especially if such safety measures are promulgated by PHMSA—would clearly represent an important opportunity with respect to the ECPG nanocomposite foams presented herein, which directly support viable non-shielding CP systems functionality as described above.

In certain examples, the compositions described herein may comprise "tuned" additions of isocyanate-treated, reduced GONPs treated with a polymer to primarily chemically- and partially water-blown, plural component SPF compositions, wherein said tuned additions may achieve complete load transfer of the electrically-conductive GONPs in the cured polyurethane matrix to produce three-dimensional foam formations capable of intrinsically "storing" CP current as generally associated with a low dielectric loss attribute.

The "tuned" addition of isocyanate-treated, reduced GONPs to, for instance, primarily chemically- and partially water-blown SPF compositions may be highly beneficial from the standpoint of at least two "secondary" key perspectives. First, "tuned" addition of GONPs with the ability to achieve complete load transfer throughout the cured polyurethane matrix may not only render such SPF compositions as electrically-conductive throughout, but further render said compositions capable of intrinsically "storing" CP current as generally associated with a low dielectric loss attribute. Second, attainment of rigid SPF performance to this extent could be beneficial from the standpoint of affording tangible savings in ICCP operating costs as related to NACE-specified underground CP conditions that may actually be met with lower applied current densities for achieving proper (i.e.—protective) pipe-to-soil potentials in certain geographical locations.

For illustrative purposes, application of one of the compositions described herein is shown in FIG. 1. The composition 120 is shown as being applied to an underground pipe 110. Dirt, topsoil, mulch, etc. 130 can be used to cover up the applied composition 120. The composition 120 generally encircles and/or encompasses the entire circumference of the pipe 110 as noted herein.

Numerous manuscripts and other information are mentioned herein. A full listing of this information is provided below.

American Chemistry Council, Inc., Introduction to Polyurethanes, Washington, D C, 2016, https://polyurethane.americanchemisty.com/Introduction-to-Polyurethanes.

A. K. Geim and K. S. Novoselov, Nature Materials, Volume 6, 2007, pp. 183-191.

A. K. Geim and A. H. MacDonald, Graphene: exploring carbon flatland, Phys Today, Volume 60 (8), 2007, pp.

B. C. Brodie, Sur le poids atomique du graphite, Ann Chim Phys, Volume 59, 1860, pp. 466-472.

[53] Wang G, Yang J, Park J, Gou X, Wang B, Liu H, et al. Facile synthesis and characterization of graphene nanosheets. J Phys Chem C 2008; 112:8192-5.

L. Staudenmaier, Verfahren zur darstellung der graphitsaure, Ber Dtsch Chem Ges, Volume 31, 1898, pp. 1481-1499.

W. Hummers and R. Offeman, Preparation of graphitic oxide, J Am Chem Soc, Volume 80, 1958, pp. 1339.

M. Hirata, T. Gotou, M. Ohba, Thin-film particles of graphite oxide, 2, Preliminary studies for internal micro fabrication of single particle and carbonaceous electronic circuits, Carbon, Volume 43, Number 3, 2005, pp. 503-510.

T. Szabo, O. Berkesi, I. Dekany, DRIFT study of deuterium-exchanged graphite oxide, Carbon, Volume 43, Number 15, 2005, pp. 3186-3189.

Lerf, H. He, Riedl T, M. Forster, J. Klinowski, 13C and 1H MAS NMR studies of graphite oxide and its chemically modified derivatives, Solid State Ionics, 101-103(Pt. 2), 1997, pp. 857-862.

Lerf, H. He, M. Forster, J. Klinowski, Structure of graphite oxide revisited, J Phys Chem B, Volume 102, Number 23, 1998, pp. 4477-4482.

Hontoria-Lucas, A. J. Lopez-Peinado, JdD Lopez-Gonzalez, M. L. Rojas-Cervantes, R. M. Martin-Aranda, Study of oxygen-containing groups in a series of graphite oxides: physical and chemical characterization, Carbon, Volume 33, Number 11, 1995, pp. 1585-1592.

H. He, T. Riedl, A. Lerf, J. Klinowski, Solid-state NMR studies of the structure of graphite oxide, J Phys Chem, Volume 100, Number 51, 1996, pp. 19954-19958.

H. He, J. Klinowski, M. Forster, A. Lerf, A new structural model for graphite oxide, Chem Phys Lett, Volume 287, Number 1, 2, 1998, pp. 53-56.

S. Stankovich, R. D. Piner, S. T. Nguyen, R. S. Ruoff, Synthesis and exfoliation of isocyanate-treated graphene oxide nanoplatelets, Carbon, Volume 44, 2006 (January), pp. 3342-3347.

S. Stankovich, R. D. Piner, X. Chen, N. Wu, S. T. Nguyen, R. S. Ruoff, Stable aqueous dispersions of graphitic nanoplatelets via the reduction of exfoliated graphite oxide in the presence of poly(sodium 4-styrenesulfonate), J Mater Chem, Volume 16, Number 2, 2005, pp. 155-158.

I. S. Blagbrough, N. E. Mackenzie, C. Ortiz, A. I. Scott, The condensation reaction between isocyanates and carboxylic acids, A practical synthesis of substituted amides and anilides, Tetrahedron Lett, Volume 27, Number 11, 1986, pp. 1251-1254.

M. B. Smith and J. March, March's advanced organic chemistry: reactions, mechanisms, and structure, New York: John Wiley & Sons Inc., 2001, p. 1182-1183.

Stankovich, D. A. Dikin, G. H. Dommett, K. M. Kohlhaas, E. J. Zimney, E. A. Stach, R. D. Piner, S. T. Nguyen, and R. S. Ruoff, Graphene-based composite materials, Nature, Volume 442, Number 7100, 2006 (July), pp. 282-286.

K. A. Worsley, P. Ramesh, S. K. Mandal, S. Niyogi, M. E. Itkis, and R. C. Haddon, Soluble graphene derived from graphite fluoride, Chem Phys Lett, 2007, 445:45151-6.

S. Niyogi, E. Bekyarova, M. E. Itkis, J. L. McWilliams, M. A. Hamon, R. C. Haddon, Solution properties of graphite and graphene, J Am Chem Soc, 2006, 128, 7720-1.

S. Stankovich, D. A. Dikin, R. D. Piner, K. A. Kohlhaas, and A. Kleinhammes, Synthesis of graphene-based nanosheets via chemical reduction of exfoliated graphite oxide, Carbon, 2007, 45, 1558-1565.

Y. Geng, S. J. Wang, and J. K. Kim, Preparation of graphite nanoplatelets and graphene sheets. J Colloid Interface Sci, 2009, 336, 592-598.

T. Wei, G. Luo, Z. Fan, C. Zheng, J. Yan, and C. Yao, Preparation of graphene nanosheet/polymer composites using in situ reduction extractive dispersion, Carbon, 2009, 47:2290-2299.

D. C. Marcano, D. V. Kosynkin, J. M. Berlin, A. Sinitskii, Z. Sun, A. Slesarev, L. B. Alemany, W. Lu, and J. M. Tour, Improved Synthesis of Graphene Oxide, ACS Nano, Volume 4 (8), 2010, pp 4806-4814.

M. J. Fernández-Merino, L. Guardia, J. I. Paredes, S. Villar-Rodil, P. Solis-Fernández, A. Martinez-Alonso, and J. M. D. Tascón, Vitamin C Is an Ideal Substitute for Hydrazine in the Reduction of Graphene Oxide Suspensions, Instituto Nacional del Carbón, J. Phys. Chem. C, Volume 114, 2010, pp 6426-6432.

G. Wang, J. Yang, J. Park, X. Gou, B. Wang, and H. Liu, Facile synthesis and characterization of graphene nanosheets, J Phys Chem C, 2008, 112, 8192-8195.

P. Blake, P. D. Brimicombe, R. R. Nair, T. J. Booth, D. Jiang, and F. Schedin, Graphene-based liquid crystal device, Nano Lett, 2008, 8, 1704-1708.

X. Li, X. Wang, L. Zhang, S. Lee, and H. Dai, Chemically derived, ultrasmooth graphene nanoribbon semiconductor, Science, 2008, 319, 1229-1231.

G. Wang, X. Shen, B. Wang, J. Yao, and J. Park, Synthesis and characterization of hydrophilic and organophilic graphene nanosheets, Carbon, 2009, 47, 1359-1364.

R. D. Dreyer, S. Park, C. W. Bielawski, and R. S. Ruoff, The chemistry of graphene oxide, Chem Soc Rev, 2010, 39, 228-240.

S. H. Xie, Y. Y Liu, J. Y. Li, Comparison of the effective conductivity between composites reinforced by graphene nanosheets and carbon nanotubes, Applied Physics Letters, Volume 92, 2008, pp. 1-3.

D. Cai, K. Yusoh, and M. Song, The mechanical properties and morphology of a graphite oxide nanoplatelet/polyurethane composite, Nanotechnology, Volume 20, 2009, pp. 1-5.

D. Cai and M. Song, The mechanical properties and morphology of a graphite oxide nanoplatelet/polyurethane Composite, Journal of Materials Chemistry, Volume 17, 2007, pp. 3678-3680.

J. T. Koberstein, A. F. Galambos, and L. M. Leung, Macromolecules, Volume 25, 1992, pp. 195-204.

K. K Sadasivuni, D. Ponnamma, B. Kumar, M. Strankowski, R. Cardinaels, P. Moldenaers, S. Thomas, Y. Grohens, Dielectric properties of modified graphene oxide filled polyurethane nanocomposites and its correlation with rheology, Composites Science and Technology, Volume 104, 2014, pp. 18-25.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A method of producing an electrically-conductive polyurethane foam, the method comprising:
   forming a reaction mixture comprising:
   (a) component A comprising an isocyanate;
   (b) component B comprising at least one polyol;
   (c) a dispersion of reduced carbon nanomaterials;
   (d) a blowing agent; and
   curing the reaction mixture to provide a three-dimensional composite structure which comprises a direct current electrical conductivity configured to conduct a provided current from an impressed current cathodic protection as employed in underground metallic oil and gas pipeline facilities.

2. The method of claim 1, wherein the dispersion of reduced carbon nanomaterials comprises graphite oxide treated with an organic isocyanate prior to exfoliation and reduction in an organic liquid dispersing medium.

3. The method of claim 1, wherein the dispersion of reduced carbon nanomaterials comprises isocyanate-treated graphite oxide nanoplatelets exfoliated from isocyanate-treated graphite oxide in an organic liquid dispersing medium using ultrasonic mixing apparatus to provide a dispersion of functionalized graphene oxide nanoplatelets.

4. The method of claim 3, wherein graphite oxide is treated with phenyl isocyanate prior to exfoliation in the organic liquid dispersing medium.

5. The method of claim 3, wherein the isocyanate-treated graphite oxide nanoplatelets in the dispersion of reduced carbon nanomaterials are reduced in the presence of a reducing agent and the at least one polyol in-situ of component B.

6. The method of claim 1, wherein the dispersion of reduced carbon nanomaterials comprises a nanoplatelets.

7. The method of claim 1, wherein the carbon nanomaterials are reduced in the presence of hydrazine reducing agent.

8. The method of claim 1, wherein the reduced carbon nanomaterials comprise a C/O atomic ratio greater than unreduced carbon nanomaterials.

9. The method of claim 1, wherein the dispersion of reduced carbon nanomaterials comprises bulk exfoliated graphite oxide nanoplatelets comprising a thickness ranging from 1 to 20 nanometers and width ranging from 1 to 50 microns.

10. The method of claim 1, wherein the reduced carbon nanomaterials comprise exfoliated, single layer graphene sheets with a sheet thickness less than about 5 nm.

11. The method of claim 1, wherein the dispersion of reduced carbon nanomaterials for addition to component B comprises exfoliated, isocyanate-treated nanoplatelets dispersed as a function of at least 0.1 wt. % of a liquid volume of the at least one polyol in component B which comprises one or more of a polyalkoxylated amine, a polyalkoxylated ether or a polyester polyol.

12. The method of claim 11, wherein the exfoliated, isocyanate-treated nanoplatelets are dispersed in component B using both or either one of ultrasonic mixing and/or mechanical stirring apparatus.

13. The method of claim 1, wherein the dispersion of reduced carbon nanomaterials for addition to component B is formulated as a master batch which comprises exfoliated, isocyanate-treated nanoplatelets dispersed as a function of at least 0.1 wt. % of a liquid volume of the at least one polyol in component B which comprises one or more of a polyalkoxylated amine, a polyalkoxylated ether, or a polyester polyol.

14. The method of claim 13, wherein the master batch of exfoliated, isocyanate-treated nanoplatelets is dispersed in component B using both or either one of ultrasonic mixing or mechanical stirring apparatus.

15. The method of claim 13, wherein the exfoliated, isocyanate-treated nanoplatelets in dispersion within component B are chemically reduced in the presence of a reducing agent to provide electrical conductivity.

16. The method of claim 13, wherein the exfoliated, isocyanate-treated nanoplatelets in dispersion within component B are chemically reduced in the presence of a reducing agent and the at least one polyol in-situ of component B for preventing agglomeration of the nanomaterials and maintaining stability of the dispersion over time.

17. The method of claim 1, wherein the reaction mixture is cured to initiate formation of chemical bonds between nanoplatelets present in the reduced carbon nanomaterials and isocyanate hard segment constituents of component A to provide graphene sheet load transfer throughout the three-dimensional composite structure.

18. The method of claim 17, wherein a cured three-dimensional composite formation comprises a percolation threshold on the order of 0.1 wt % filler weight fraction from the nanoplatelets which form an interconnecting network of electrically-conductive paths throughout the cured reaction mixture of components A and B.

19. The method of claim 1, wherein the cured three-dimensional composite structure comprises direct current electrical conductivity levels, ranging from about 0.1 S/m up to about 1 S/m, to enable mitigation of external corrosion of underground metallic oil and gas pipeline facilities, wherein the electrically-conductive composite is configured to conduct a provided current from an impressed current cathodic protection system throughout said cured three-dimensional composite structure, the conducted current thereby providing a cathodic polarization potential of—850 mV between a metallic pipe surface and surrounding electrolyte.

20. The method of claim 19, wherein the cured three-dimensional composite structure comprises direct current electrical conductivity levels, ranging from about 0.1 S/m up to about 1 S/m, which enables mitigation of external corrosion of metallic pipe surfaces beneath, and interfacial contact with, an entire physical longitudinal length of the cured three-dimensional composite structure, wherein the cured three-dimensional composite structure is configured to conduct the provided current from the impressed current cathodic protection system throughout said cured three-dimensional composite structure, the conducted current providing the cathodic polarization potential of—850 mV between the metallic pipe surface and the surrounding electrolyte.

21. The method of claim 20, wherein the direct current electrical conductivity of the cured three-dimensional composite structure is configured to provide interfacial current flow, as associated with cathodic protection, at the circumferential interface of a carbon steel pipe surface and an applied electrically-conductive polyurethane foam of components A and B.

22. The method of claim 1, wherein the at least one polyol of component B may be selected from the group consisting of polyalkoxylated amines, polyalkoxylated ethers, and polyester polyols.

23. The method of claim 1, further comprising curing the reaction mixture in the presence of water.

24. The method of claim 1, further comprising curing the reaction mixture in the presence of a cell closing surfactant in component B which provides a closed-cell content up to 90% or more of total cell count.

25. The method of claim 1, further comprising the reaction mixture in the presence of a cell-opening surfactant in component B which provides an open-cell content of at least 50% of total cell count.

26. The method of claim 1, wherein the reaction mixture comprises, in component B, (i) a hydroxyl number from about 20 to about 750 and, (ii) for cell opening, a cell-opening surfactant from about 0.10% to about 4.0% by weight or, for cell-closing, a cell-closing surfactant from about 0.10% to about 4.0% by weight to thereby form a cured three-dimensional composite structure with a density and compressive strength, as well as flotation resistance, that physically supports and stabilizes carbon steel oil and gas pipeline structures from 36.0 inches in diameter to 56.0 inches in diameter and mitigates the carbon steel oil and gas pipeline structures susceptibly to flotation.

27. The method of claim 1, wherein the reaction mixture comprises, in component B, (i) a hydroxyl number from about 20 to about 750, (ii) for cell opening, a cell-opening surfactant from about 0.10% to about 4.0% by weight or, for cell closing, a cell-closing surfactant from about 0.10% to about 4.0% by weight to provide a cured three-dimensional composite structure with (a) a material density, (b) a compressive strength, (c) storage modulus, (d) damping factor and (e) Young's modulus that mitigates pipe ovality and denting conditions in underground carbon steel pipeline structures, as well as external coating damage, on underground carbon steel oil and gas pipeline structures from 36.0 inches in diameter to 56.0 inches in diameter.

28. The method of claim 1, wherein curing the reaction mixture of components A and B provides a three-dimensional composite structure which, on a collective basis, comprises (i) a material density, (ii) compressive strength, (iii) storage modulus, (iv) damping factor, and (v) Young's modulus optimized for underground operation of oil and gas pipelines from 36.0 inches in diameter to 56.0 inches in diameter.

29. The method of claim 1, wherein curing of the reaction mixture is initiated by mixing components A and B via high-pressure spray application.

30. The method of claim 29, wherein the high-pressure spray application of said components A and B comprises a foaming process which forms a three-dimensional composite structure comprising at least one of an electrically-conductive polyurethane foam pad, pillow, or trench breaker for use in underground oil and gas pipeline facilities construction.

31. The method of claim 30, wherein spraying said components A and B to cure the reaction mixture comprises an electrically-conductive polyurethane foam configured to conduct a provided current from an impressed current cathodic protection system wherever the foam contacts a protected metallic pipe, wherein the electrically-conductive foam comprises direct current electrical conductivity levels of at least 0.1 S/m to thereby conduct provided current in satisfaction of industry-standard—850 mV cathodic polarization potential between the metallic pipe surface and surrounding electrolyte.

32. The method of claim 1, further comprising curing the reaction mixture in the presence of a catalyst.

* * * * *